(12) United States Patent
Liu

(10) Patent No.: US 10,735,391 B2
(45) Date of Patent: Aug. 4, 2020

(54) INSTRUCTION INFORMATION TRANSMISSION AND RECEPTION METHODS AND DEVICES THEREOF

(71) Applicant: KUANG-CHI INTELLIGENT PHOTONIC TECHNOLOGY LTD., Shenzhen (CN)

(72) Inventor: Ruopeng Liu, Shenzhen (CN)

(73) Assignee: KUANG-CHI INTELLIGENT PHOTONIC TECHNOLOGY LTD., Shenzhen (CN)

( * ) Notice: Subject to any disclaimer, the term of this patent is extended or adjusted under 35 U.S.C. 154(b) by 547 days.

(21) Appl. No.: 15/153,759

(22) Filed: May 13, 2016

(65) Prior Publication Data

US 2016/0255072 A1 Sep. 1, 2016

Related U.S. Application Data

(63) Continuation of application No. PCT/CN2014/091136, filed on Nov. 14, 2014.

(30) Foreign Application Priority Data

Nov. 15, 2013 (CN) .......................... 2013 1 0574317
Nov. 16, 2013 (CN) ...................... 2013 2 0728174 U

(51) Int. Cl.
*G06F 21/00* (2013.01)
*H04L 29/06* (2006.01)
(Continued)

(52) U.S. Cl.
CPC .............. *H04L 63/08* (2013.01); *G06F 9/455* (2013.01); *G06Q 20/327* (2013.01); *G06Q 20/3272* (2013.01); *H04L 67/32* (2013.01)

(58) Field of Classification Search
CPC .................................................... H04L 63/126
See application file for complete search history.

(56) References Cited

U.S. PATENT DOCUMENTS

| 8,321,922 B1 | 11/2012 | Lo et al. |
| 2010/0184479 A1 | 7/2010 | Griffin, Jr. |

(Continued)

FOREIGN PATENT DOCUMENTS

| CN | 1705310 A | 12/2005 |
| CN | 2899293 Y | 5/2007 |

(Continued)

OTHER PUBLICATIONS

"Near Field Communication—Interface and Protocol (NFCI P-1)", Standard ECMA-340, Jun. 30, 2013, 3rd Edition.

(Continued)

*Primary Examiner* — Josnel Jeudy
(74) *Attorney, Agent, or Firm* — Armstrong Teasdale LLP

(57) ABSTRACT

This application discloses a method and device for sending and receiving instruction information. The method for sending instruction information includes: receiving first instruction information and/or operation description information of an operation corresponding to the first instruction information; if the first instruction information is received, temporarily storing the received first instruction information locally; and/or if the operation description information is received, transmitting the operation description information to a mobile terminal; acquiring a first differential signal that is output from a data transmission interface of the mobile terminal and carries the first instruction information and/or the second instruction information; and/or acquiring the first differential signal if a trigger signal sent by the receiving device is received; generating, according to the acquired first differential signal, a first transmission signal that carries the (Continued)

Receive a first transmission signal that is sent by the sending apparatus and carries the first instruction information, where the sending apparatus is connected onto a data transmission interface of the mobile terminal, so that the sending apparatus acquires a first differential signal that is output by the mobile terminal from the data transmission interface and carries the first instruction information and/or the second instruction information, where the second instruction information is used to instruct the sending apparatus to send the first transmission signal, where the first transmission signal is a light signal or a sound wave signal — S902

Perform an operation corresponding to the first instruction information according to the received first transmission signal — S904 first instruction information, and sending the first transmission signal to the receiving device.

12 Claims, 7 Drawing Sheets

(51) Int. Cl.
*G06F 9/455* (2018.01)
*G06Q 20/32* (2012.01)
*H04L 29/08* (2006.01)

(56) References Cited

U.S. PATENT DOCUMENTS

| | | | |
|---|---|---|---|
| 2011/0153885 A1 | 6/2011 | Mak et al. | |
| 2012/0171963 A1* | 7/2012 | Tsfaty | H04B 11/00 455/41.3 |
| 2013/0203345 A1* | 8/2013 | Fisher | H04B 11/00 455/41.1 |
| 2013/0217331 A1 | 8/2013 | Manente | |

FOREIGN PATENT DOCUMENTS

| | | |
|---|---|---|
| CN | 102572353 A | 7/2012 |
| CN | 202488456 U | 10/2012 |
| CN | 102769684 A | 11/2012 |
| CN | 103294984 A | 9/2013 |
| CN | 103295347 A | 9/2013 |
| CN | 103297144 A | 9/2013 |
| CN | 103338072 A | 10/2013 |
| CN | 103366423 A | 10/2013 |
| CN | 103793261 A | 5/2014 |
| EP | 1555621 A1 | 7/2005 |
| JP | 2002527012 A | 8/2002 |
| JP | 2004328430 A | 11/2004 |
| KR | 20030079640 A | 10/2003 |
| KR | 20060046331 A | 5/2006 |
| WO | 2012132171 A1 | 10/2012 |

OTHER PUBLICATIONS

Extended European Search Report, dated Nov. 15, 2016, EP Application No. 148617921.1;, Nov. 15, 2016, 11 pages.

* cited by examiner

INSTRUCTION INFORMATION TRANSMISSION AND RECEPTION METHODS AND DEVICES THEREOF

CROSS REFERENCE TO RELATED APPLICATIONS

This application is a continuation of PCT Application No. PCT/CN2014/091136 filed on Nov. 14, 2014, which claims priority to Chinese patent application No. 201310574317.1 of Nov. 15, 2013 and Chinese patent application No. 201320728174.0 of Nov. 16, 2013, all of which are incorporated herein by reference.

TECHNICAL FIELD

This present disclosure relates to the field of security authentication, and in particular, to a method and a device for sending and receiving instruction information.

BACKGROUND

In the field of security authentication, a traditional access management system generally uses a smart card such as an integrated circuit card as a unique personal identifier to get registered on a distribution platform beforehand. Registered relevant data is saved into an access controller by using a device network connected to the distribution platform. In the foregoing scenario, a user may, when accessing a door, place a held smart card within a valid recognition range of a card reader connected to the access controller, for example, may swing the smart card slightly before the card reader to perform feature recognition. Further, data of the smart card, which is read by the card reader, is transmitted to the access controller, and the access controller implements authentication on the user according to matching between saved registration information and acquired data. In this process, generally, if the matching succeeds, processing is performed normally, namely, an electronic lock is driven to open the door; otherwise, the door keeps closed, and event information may be transmitted to a system such as an alarm system and a monitoring system so that a third party processes the event information.

On the basis of the traditional access control system, a system formed by applying a light-controlled system to access management may be called an optical access control system. Compared with the traditional access control system, because the optical access control system avoids inconvenience brought by the smart card, for example, the smart card is recognizable only when it is placed within a valid recognition range of the card reader, the smart card is highly vulnerable to being cracked, and the like. Thus the optical access control system has merits such as ease of use and high reliability.

An existing optical access control system generally needs to use a mobile terminal such as a mobile phone to save authentication information held by the user. The mobile phone needs to have a light-emitting device so that a receive end can acquire a light signal sent from the mobile phone. In the prior art, the light-emitting device is generally a camera flash of the mobile phone itself. However, the camera flash of the mobile phone itself is not specially designed for sending a light signal, and flash frequency is generally configured by a vendor according to an application mode. Therefore, adaptable sending methods need to be custom-made for models of the mobile phones, so that a light signal that has frequency and light intensity specified by the receive end can be transmitted and so that the receive end can recognize the light signal correctly. Besides, no camera flash is installed on mobile phones of some models. Consequently, it is limited that a camera flash or another built-in light-emitting component of a mobile phone is used to perform light communications, and it is a problem that a same light communication method or a client used for light communications is hardly compatible with a mobile phone of a different model.

No effective solution to the foregoing problem has been put forward so far.

SUMMARY

Embodiments of this application provide a method and a device for sending and receiving instruction information to at least solve a technical problem that the existing light communications mode is hardly compatible with mobile terminals of different models.

According to one aspect of the embodiments of this application, a method for sending instruction information is provided, including: receiving first instruction information and/or operation description information of an operation corresponding to the first instruction information, where the operation description information includes at least one of the following: code information, time information, address information, user information, account information, commodity information, and payment information; if the first instruction information is received, temporarily storing the received first instruction information locally; and/or if the operation description information is received, transmitting the operation description information to a mobile terminal, so that the mobile terminal indicates the operation description information to a user, and so that the mobile terminal generates the first instruction information and/or second instruction information according to input information of the user and/or the operation description information; acquiring a first differential signal that is output from a data transmission interface of the mobile terminal and carries the first instruction information and/or the second instruction information, which specifically includes: acquiring the first differential signal if a recognition signal indicating that a distance between the mobile terminal and a receiving device is smaller than a preset distance threshold is received; and/or acquiring the first differential signal if a trigger signal sent by the receiving device is received, where the first instruction information is used to instruct the receiving device to perform an operation corresponding to the first instruction information, and the second instruction information is used to instruct to send the first instruction information to the receiving device; and generating, according to the acquired first differential signal, a first transmission signal that carries the first instruction information, and sending the first transmission signal to the receiving device, where the first transmission signal is a light signal or a sound wave signal.

According to another aspect of the embodiments of this application, a method for receiving instruction information is provided, including: sending operation description information of an operation corresponding to first instruction information to a sending device or a mobile terminal, so that the mobile terminal indicates the operation description information to a user, and so that the mobile terminal generates the first instruction information and/or second instruction information according to input information of the user and/or the operation description information, where the operation description information includes at least one of the following: code information, time information, address information, user information, account information, commodity information, and payment information; receiving a first transmission signal that is sent by the sending device and carries the first instruction information, where the sending device is connected to a data transmission interface of the mobile terminal, so that the sending device acquires a first differential signal that is output by the mobile terminal from the data transmission interface and carries the first instruction information and/or the second instruction information, which specifically includes: acquiring the first differential signal if a recognition signal indicating that a distance between the mobile terminal and a receiving device is smaller than a preset distance threshold is received; and/or acquiring the first differential signal if a trigger signal sent by the receiving device is received, where the second instruction information is used to instruct the sending device to send the first transmission signal, where the first transmission signal is a light signal or a sound wave signal; and performing an operation corresponding to the first instruction information according to the received first transmission signal.

According to another aspect of the embodiments of this application, a device for sending instruction information is provided, including: a first acquiring unit, configured to acquire a first differential signal that is output from a data transmission interface of a mobile terminal and carries first instruction information and/or second instruction information, where the first instruction information is used to instruct a receiving device to perform an operation corresponding to the first instruction information, and the second instruction information is used to instruct to send the first instruction information to the receiving device; a first transmitting unit, configured to generate, according to the acquired first differential signal, a first transmission signal that carries the first instruction information, and send the first transmission signal to the receiving device, where the first transmission signal is a light signal or a sound wave signal; a receiving unit, configured to receive first instruction information and/or operation description information of an operation corresponding to the first instruction information, where the operation description information includes at least one of the following: code information, time information, address information, user information, account information, commodity information, and payment information; a storing unit, configured to: when the first instruction information is received, temporarily store the received first instruction information locally; and/or a third transmitting unit, configured to: when the operation description information is received, transmit the operation description information to a mobile terminal, so that the mobile terminal indicates the operation description information to a user, and so that the mobile terminal generates the first instruction information and/or second instruction information according to input information of the user and/or the operation description information, where the first acquiring unit includes a third acquiring module, configured to acquire the first differential signal when a recognition signal indicating that a distance between the mobile terminal and the receiving device is smaller than a preset distance threshold is received, and/or acquire the first differential signal when a trigger signal sent by the receiving device is received.

According to another aspect of the embodiments of this application, a device for receiving instruction information is provided, including: a first receiving unit, configured to receive a first transmission signal that is sent by a sending device and carries first instruction information, where the sending device is connected to a data transmission interface of a mobile terminal, so that the sending device acquires a first differential signal that is output by the mobile terminal from the data transmission interface and carries the first instruction information and/or second instruction information, where the second instruction information is used to instruct the sending device to send the first transmission signal, where the first transmission signal is a light signal or a sound wave signal, which specifically includes: acquiring the first differential signal if a recognition signal indicating that a distance between the mobile terminal and the receiving device is smaller than a preset distance threshold is received; and/or acquiring the first differential signal if a trigger signal sent by the receiving device is received; a processing unit, configured to perform an operation corresponding to the first instruction information according to the received first transmission signal; and a second transmitting unit, configured to send operation description information of an operation corresponding to the first instruction information to the sending device or the mobile terminal, where the operation description information includes at least one of the following: code information, time information, address information, user information, account information, commodity information, and payment information, so that the mobile terminal indicates the operation description information to a user, and so that the mobile terminal generates the first instruction information and/or the second instruction information according to input information of the user and/or the operation description information.

In the embodiments of this application, it may be deemed that instruction information is output to an exterior of a mobile terminal through a data transmission interface of the mobile terminal in a form of a differential signal. For example, the instruction information may be output to a light signal generator that is connected to the mobile terminal through the data transmission interface, and further, a differential signal that carries the instruction information may be converted into a first light signal by using the light signal generator, and then the first light signal is transmitted. In the foregoing scenario, data transmission interfaces that have similar specifications and a considerable information transmission rate are disposed on a majority of mobile terminals, and therefore, a signal sending method according to the embodiments of this application is free from a limitation on compatibility and the information transmission rate, where the limitation is caused by a different setting of flash frequency and overall low flash frequency when a light signal is sent by using a camera flash. In this way, a technical problem that the existing light communications mode is hardly compatible with a mobile terminal of a different model is solved, an effect of being compatible with mobile terminals of different models is accomplished, and further, an effect of improving the information transmission rate is accomplished. Further, because the information transmission rate is improved, on the one hand, encryption and encoding manners that are more sophisticated can be applied to instruction information that carries authentication information, and security and reliability of an authentication system can be improved, and on the other hand, more user-related information can be carried, and an application scope of the authentication system can be increased.

BRIEF DESCRIPTION OF DRAWINGS

The accompanying drawings described herein are intended for better understanding of this application, and constitute a part of this application. Exemplary embodiments and descriptions thereof in this application are intended to interpret this application and do not constitute any improper limitation on this application. In the accompanying drawings.

EMBODIMENTS

The following describes this application in detail with reference to accompanying drawings and embodiments. It should be noted that the embodiments in this application and features in the embodiments may be combined with each other without conflicts.

Embodiment 1

Figure 1:
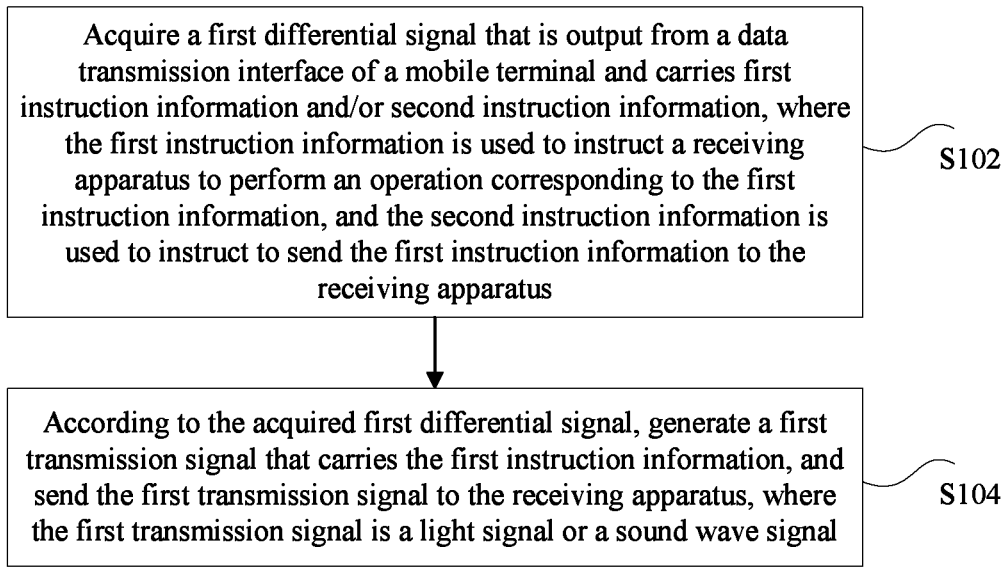
FIG. 1 is a schematic diagram of an optional method for sending instruction information according to an embodiment of this application.

According to the embodiments of this application, a method for sending instruction information is provided. As shown in FIG. 1, the sending method includes:

S102. Acquire a first differential signal that is output from a data transmission interface of a mobile terminal and carries first instruction information and/or second instruction information. The first instruction information is used to instruct a receiving device to perform an operation corresponding to the first instruction information, and the second instruction information is used to instruct to send the first instruction information to the receiving device.

This application may provide an adaptation device of a mobile terminal. The adaptation device may include a data transmission interface component that serves as a data transmission interface, and a signal transmitter. In the implementation process of the step S102, the data transmission interface component in the adaptation device, which is connected to a data transmission interface of the mobile terminal, may be used to acquire and output a differential signal that is output from the data transmission interface.

S104. According to the acquired first differential signal, generate a first transmission signal that carries the first instruction information, and send the first transmission signal to the receiving device, where the first transmission signal is a light signal or a sound wave signal.

In the implementation process of the step S104, a signal transmitter in the adaptation device, which is connected to the data transmission interface component, may be used to transmit the light signal or the sound wave signal. It should be understood that one of problems that the technical solution of this application intends to solve is to provide a method for transmitting instruction information from a mobile terminal to a receiving device (or a signal receiver), where the instruction information may be used to instruct the receiving device (or signal receiver) to perform an operation corresponding to the instruction information. In this way, by performing the operation on the mobile terminal on one end, a user can instruct the receiving device (or signal receiver) to perform one or more corresponding operations. Specifically, a plurality of operations may be performed by the receiving device (or signal receiver), and will be described in detail in subsequent embodiments of this application, which is not limited by this application. For ease of description, the instruction information is hereinafter referred to as first instruction information.

A plurality of solutions to this problem are available in the prior art. For example, in a traditional mobile terminal application, the solution may be implemented in the following manner: The mobile terminal may use a built-in radio transmitting module and use an electromagnetic wave to carry and send the first instruction information. Alternatively, for a mobile terminal that uses a light communication mode, in order to overcome the problem brought by the preceding manner, the following manner may be applied: The mobile terminal may use a camera flash or the like and use visible light to carry and send the first instruction information to the receiving device (or signal receiver). However, for the latter manner, because light transmitting modules such as camera flashes that are built in the mobile terminals produced by different vendors have different specifications, different light communication solutions need to be designed to match the mobile terminals of different specifications. In other words, the following defect is caused: One method for sending instruction information is hardly compatible with a mobile terminal of a different model.

To overcome the defect, in step S102 in a method for sending instruction information according to an embodiment of this application, a differential signal that is output from a data transmission interface of the mobile terminal and carries the first instruction information may be acquired. The first instruction information is used to instruct a receiving device (or signal receiver) to perform an operation corresponding to the first instruction information.

Different from the prior art, in the embodiment of this application, the first instruction information is no longer sent by a built-in module or device in an existing mobile terminal to the receiving device (or signal receiver). Instead, a differential signal output through a data transmission interface (or data transmission interface component) of the mobile terminal is transmitted to a sending device (or signal transmitter) connected to the data transmission interface, and then sent by the sending device (or signal transmitter) to the receiving device (or signal receiver) in a light communications manner or a sound wave communications manner. In this process, because the mobile terminals produced by all vendors have relatively consistent designs on the data transmission interface and the manner of outputting the differential signal through the data transmission interface, for the sending device (or signal transmitter), the same or similar solutions may be applied to both the design on a physical connection to the data transmission interface and the design on acquisition and recognition of the differential signal output through the data transmission interface. In this way, the problem that the existing light communications mode is hardly compatible with a mobile terminal of a different model is overcome at the end of coupling with the mobile terminal. For ease of description, the differential signal that is output from a data transmission interface and carries the first instruction information is hereinafter referred to as a first differential signal.

Specifically, in the embodiment of this application, the manner of transmitting the first differential signal through the data transmission interface (or data transmission interface component) may be user-defined according to a wiring terminal of the data transmission interface. Preferably, the data transmission interface (or data transmission interface component) may be a USB interface. For example, it may include at least one of the following: a USB interface, a mini USB interface, a micro USB interface, and a Dock interface. For existing USB interfaces, interface definitions are generally the same. That is, four connection wires are generally disposed, which are: data positive (data+), data negative (data−), power supply (+5V), and ground (GND), where an analog parameter difference between data positive and data negative constitutes the differential signal. In the embodiment of the present disclosure, the four connection wires may be used to implement sending and receiving of signals. For example, a power supply wire may be connected to a power supply module to provide electrical power for operation of a system, and data positive and data negative may be connected to a USB interface component in the sending device (or signal transmitter) to implement acquisition of the signals.

In a preferred embodiment of the present disclosure, the adaptation device of the mobile terminal may further include a processor connected between the data transmission interface component and the signal transmitter. The processor is configured to generate and output a digital signal according to the differential signal output by the data transmission interface component. The signal transmitter is further configured to generate and transmit a light signal or a sound wave signal according to the digital signal output by the processor.

Further, the adaptation device of the mobile terminal in this application may further provide a signal receiver connected to the processor. The signal receiver is configured to receive a sound wave signal or a light wave signal, and convert the received sound wave signal or light wave signal into an electrical signal. The processor is further configured to convert the electrical signal into a differential signal, and transmit the differential signal through the data transmission interface to the mobile terminal.

Preferably, the signal transmitter may be a sound wave transmitter or a light wave transmitter. The sound wave transmitter is configured to transmit at least one of an infrasonic wave, an audible wave, and an ultrasonic wave. The light wave transmitter is configured to transmit at least one of infrared light, visible light, and ultraviolet light.

For the foregoing scenario, it should be noted that although the sending device (or signal transmitter) is an external module for the existing mobile terminal and is not a conventional design of the existing mobile terminal, it does not prevented that a designer implants the sending device (or signal transmitter) into the mobile terminal in a future design solution of the mobile terminal. From this perspective, the data transmission interface is not necessarily exposed outside the mobile terminal in a well-known manner, such as a data transmission interface on a housing of a mobile phone, but the data transmission interface may also be an interface that is disposed inside the mobile terminal, matches the implanted sending device (or signal transmitter) and is configured to output the first differential signal. Further, it should be understood that for both the existing data transmission interface disposed outside the mobile terminal and the data transmission interface that will possibly come forth in the future and will be disposed inside the mobile terminal, the specific shape and the specific material of the data transmission interface are diversified, which does not affect implementation of the technical solution of this application and fulfillment of technical effects of the technical solution, and this application does not limit the shape and the material in any way.

In another aspect, based on the same conception, in some embodiments of this application, the first differential signal acquired from the data transmission interface of the mobile terminal may not carry the first instruction information, but carry other instruction information that instructs the sending device (or signal transmitter) to send the first instruction information to the receiving device (or signal receiver). In this way, the first differential signal that carries the other instruction information may also be acquired in step S102. For ease of description, the other instruction information is hereinafter referred to as second instruction information.

For example, in an embodiment, the first differential signal may carry the first instruction information 00001, where 00001 may represent an instruction code. An operation corresponding to the instruction code, which the receiving device (or signal receiver) is instructed to perform, may be an unlock operation, or an unlock signal is sent to the unlock device. In another embodiment, the first differential signal may not carry the first instruction information 00001, but carry a binary bit such as 0 or 1 that is used to instruct to send the first instruction information to the receiving device (or signal receiver). In this scenario, the first instruction information 00001 to be sent may be pre-stored locally on the sending device (or signal transmitter) so that the sending device (or signal transmitter) responds to the first differential signal that carries the second instruction information and is acquired from the data transmission interface, and sends the first instruction information.

Certainly, the foregoing is merely an example for facilitating understanding of the technical solution of the present disclosure, and does not constitute any limitation on this application. For example, the first instruction information is not limited to the instruction code mentioned above, and may also be a binary bit, where a binary bit 1 instructs the receiving device (or signal receiver) to perform an operation, and a binary bit 0 instructs the receiving device (or signal receiver) to be on standby, or the like. In addition, in a scenario that the first differential signal carries the second instruction information but does not carry the first instruction information, the first instruction information may not be stored in a fixed storage area in the sending device (or signal transmitter), but the first instruction information sent by the receiving device (or signal receiver) is received temporarily before the first differential signal is acquired, and is written into a buffer or a register for invoking. For example, in a scenario related to a payment service, one end of light communications or sound wave communications is a mobile terminal held in a hand of a paying user, where a sending device (or signal transmitter) is mounted on a data transmission interface of the mobile terminal, and the other end is a point of sale (POS) machine that serves as a receiving device (or signal receiver) and is operated by a salesperson. Therefore, the salesperson may tell the paying user a payable sum in the payment service first, and at the same time, a disbursable sum corresponding to a disbursement operation that the POS machine is ready to perform is displayed on a user-oriented display screen of the POS machine, and the POS machine is controlled to send temporarily generated first instruction information corresponding to the disbursement operation to the sending device (or signal transmitter) on the mobile terminal. The paying user may press a key indicative of payment confirmation on the mobile terminal only after the paying user determines that the payable sum is reasonable and that the disbursable sum is consistent with the payable sum. In this way, the mobile terminal may generate, according to the user input, a first differential signal that carries second instruction information, and transmit the first differential signal to the sending device (or signal transmitter) through the data transmission interface. Further, the sending device (or signal transmitter) returns the first instruction information to the POS machine according to the second instruction information in the input first differential signal. Finally, the POS machine completes a sum disbursement operation according to the returned first instruction information. In the foregoing scenario, because the first instruction information is generated temporarily and is not easy to crack, a malicious action performed by cracking the first instruction information corresponding to the sum disbursement operation is restricted. In another aspect, because the first instruction information does not enter the mobile terminal, malicious software installed on the mobile terminal is prevented from stealing the first instruction information, and security of the payment service is further improved.

In addition, in some embodiments of this application, the first instruction information and the second instruction information may be used together. That is, in the step S102, the first differential signal that carries both the first instruction information and the second instruction information may be acquired. In this scenario, the first instruction information and the second instruction information may come from different confirmation mechanisms. For example, the first instruction information corresponding to an unlock operation may come from confirmation of a user identity. For example, after determining that a user fingerprint acquired from a touchscreen of the mobile terminal matches a record in a fingerprint database, the mobile terminal may add the first instruction information into the first differential signal. The second instruction information may come from confirmation performed by the user for the unlock operation. For example, after the fingerprint of the user is recorded, the user touches or presses the same area on the touchscreen again, which may be recognized by the mobile terminal as a confirmation signal input by the user for confirming the unlock operation, and therefore, the mobile terminal also adds the second instruction information into the first differential signal, and transmits the first differential signal that carries both the first instruction information and the second instruction information to the sending device (or signal transmitter) through the data transmission interface. In this way, the sending device (or signal transmitter) may, according to the received first differential signal, send to the receiving device (or signal receiver) the first instruction information used to perform the unlock operation, so that the receiving device (or signal receiver) completes the unlock operation. In the foregoing scenario, two confirmation mechanisms are used together to complete the unlock operation ultimately, thereby improving reliability of the light communications or sound wave communication process.

On the basis of the foregoing description, according to the sending method provided in the embodiment of this application, the communication mode described above or below, which is used for sending the first instruction information to the receiving device (or signal receiver), may be a light communications mode or a sound wave communications mode. That is, after the first differential signal that carries the first instruction information and/or the second instruction information is acquired in the step S102, in the step S104, a transmission signal that carries the first instruction information may be generated according to the acquired first differential signal, and the transmission signal may be sent to the receiving device (or signal receiver). The transmission signal may be a light signal or a sound wave signal. For ease of description, the transmission signal is hereinafter referred to as a first transmission signal.

In the foregoing way, in the embodiment of this application, the problem of compatibility of mobile terminals of different models is solved on the side of coupling between the sending device (or signal transmitter) and the mobile terminal, and light communications or sound wave communications are implemented between the sending device (or signal transmitter) and the receiving device (or signal receiver). Therefore, the above two advantages are exerted. In addition, because a task that needs to be performed by the sending device (or signal transmitter) has simple and intuitional logics, the structure of the sending device may be relatively simple, and manufacturing costs of the sending device are relatively low. Therefore, inconvenience of using the sending device (or signal transmitter) for implementing the foregoing sending method is generally avoided for the user.

In the foregoing embodiment, this application discloses a basic implementation manner, namely, a light communication or sound wave communication mode in which the first instruction information that instructs the receiving device (or signal receiver) to perform a corresponding operation is transmitted from the sending device (or signal transmitter) to the receiving device (or signal receiver). However, considering higher security level requirements and richer function design requirements, in the embodiment of the present disclosure, a function of authenticating the user of the mobile terminal may be implanted into the method for sending instruction information. Specifically, authentication information for authenticating the user of the mobile terminal or the mobile terminal is sent in addition to the first instruction information to the receiving device (or signal receiver). The authentication information may be sent together with the first instruction information to the receiving device (or signal receiver) by using the first transmission signal, or may be sent, before or after the first transmission signal, to the receiving device (or signal receiver) by another transmission signal, which is not limited in this application. However, both a sending logic of the first instruction information and a sending logic of the authentication information should correspond to a receiving and processing logic at the end of the receiving device (or signal receiver). Obviously unreasonable extensions and expansions for this application shall not be regarded as limitations on this application.

Specifically, in one of practicable implementation manners, before the step S102, the sending method may include:

S202: Acquire a second differential signal that is output from a data transmission interface and carries authentication information, where the authentication information is used for the receiving device (or signal receiver) to authenticate the mobile terminal.

S204. According to the acquired second differential signal, generate a second transmission signal that carries the authentication information, and send the second transmission signal to the receiving device (or signal receiver). The receiving device (or signal receiver) returns third instruction information according to the authentication information. The second transmission signal is a light signal or a sound wave signal.

The step S102 may be: S206: Acquire the first differential signal if the third instruction information is received.

In the embodiment of this application, before acquiring the first differential signal and starting the operation of sending the first transmission signal to the receiving device (or signal receiver) in the step S102 or the step S206, the sending device (or signal transmitter) may firstly receive the second differential signal that is transmitted by the mobile terminal through the data transmission interface and carries the authentication information, and send to the receiving device (or signal receiver) the second transmission signal that carries the authentication information, so that the receiving device (or signal receiver) authenticates the mobile terminal, and further, the sending device (or signal transmitter) may, after receiving the third instruction information returned by the receiving device (or signal receiver) after the authentication succeeds, perform an operation of acquiring the first differential signal in the step S206, where the second transmission signal may also be a light signal or a sound wave signal.

Specifically, in the embodiment of this application, the second transmission signal and the first transmission signal may share a same signal generator or may be generated by different signal generators. For example, in an embodiment, the first transmission signal may be a visible light signal transmitted by a visible light signal generator, and the second transmission signal may be an infrared light signal transmitted by an infrared light signal generator. It should be noted that the light signal mentioned in the foregoing or following embodiments of this application may include at least one of the following: a visible light signal, an infrared light signal, and an ultraviolet light signal. The sound wave signal mentioned in the foregoing or following embodiments may include at least one of the following: an infrasonic wave, an audible sound wave, and an ultrasonic wave, which is not limited in this application. All implementation manners based on such applications shall fall within the protection scope of this application.

In the foregoing scenario, the task of "the receiving device (or signal receiver) authenticates the mobile terminal" is performed before the task of "the mobile terminal sends the first instruction information to the receiving device (or signal receiver) by using the sending device (or signal transmitter) so that the receiving device (or signal receiver) performs the corresponding operation", so that the receiving device (or signal receiver) may perform the indicated operation after confirming legality of the mobile terminal and the user of the mobile terminal, which improves security of the light communications or sound wave communications solution. The manner used by the receiving device (or signal receiver) to return the third instruction information to the sending device (or signal transmitter) may be a communication mode of radio, visible light, or invisible light. For example, the third instruction information may be carried by infrared light, and therefore, on the one hand, advantages of a compact structure and low power consumption of an infrared receiving module can be exerted, and on other hand, visual interference caused to the user of the mobile terminal is avoided, where the visual interference is caused when the third instruction information is returned by using visible light.

Considering higher security level requirements, in another practicable implementation manner in an embodiment of this application, before the step S102, the sending method may further include:

S202: Acquire a second differential signal that is output from a data transmission interface and carries authentication information, where the authentication information is used for the receiving device (or signal receiver) to authenticate the mobile terminal.

S204. According to the acquired second differential signal, generate a second transmission signal that carries the authentication information, and send the second transmission signal to the receiving device (or signal receiver). The receiving device (or signal receiver) returns third instruction information according to the authentication information. The second transmission signal is a light signal or a sound wave signal.

The step S102 may be: S302: Receive and authenticate the third instruction information, and acquire the first differential signal if the authentication succeeds.

Compared with the preceding implementation manner, this embodiment differs in that the step S302 is performed in place of the step S206. In other words, in this embodiment, after receiving the third instruction information indicating that the receiving device (or signal receiver) authenticates the mobile terminal successfully, the sending device (or signal transmitter) does not directly acquire the first differential signal and start the subsequent operations of generating and sending the first transmission signal, but verifies the returned third instruction information first and then starts to acquire the first differential signal after the verification succeeds. In the foregoing scenario, by means of confirming twice, reliability of the light communication or sound wave communication are improved on the one hand, and on the other hand, a more complicated authentication logic may be further integrated in this embodiment. For example, in an instance of this application, the authentication information pre-allocated to the mobile terminal is not the authentication information itself, but is an encryption algorithm. The authentication information may include a random code generated by the mobile terminal, and a first code value obtained by the mobile terminal by processing the random code according to the encryption algorithm. After receiving the random code carried in the second transmission signal sent by the sending device (or signal transmitter), the receiving device (or signal receiver) may obtain a second code value by processing the random code according to the same encryption algorithm, and return the second code value as the third instruction information to the sending device (or signal transmitter). Subsequently, if the returned second code value is consistent with the first code value in the authentication information, it is deemed that the verification succeeds, and the operation of acquiring the first differential signal is performed in the step S302; otherwise, it is deemed that the verification fails. In other words, in the embodiment of this application, the step of receiving and verifying the third instruction information in the step S302 may include:

S402. Receive the third instruction information, and determine whether the received third instruction information matches the authentication information, and if the received third instruction information matches the authentication information, determine that the verification succeeds.

In the foregoing scenario, because the authentication information is not fixed, and thus is not easy to crack, which further improves security of the light communications or sound wave communications solution. Certainly, the foregoing is merely an example. In other embodiments of this application, there may be multiple manners of matching between the third instruction information and the authentication information, other verification manners may be applied, the verification processing for the returned third instruction information may be performed not on the sending device (or signal transmitter), but on the mobile terminal, and so on, which is not described repeatedly in this application.

Apart from the foregoing implementation manner, in an embodiment of this application, the first instruction information itself may also be authentication information. After receiving the first instruction information or authentication information, the receiving device (or signal receiver) may authenticate the mobile terminal or the user of the mobile terminal according to the authentication information, and after the authentication succeeds, perform a corresponding operation, for example, a preset operation corresponding to this type of authentication information, or the like.

In addition, the authentication information used for authenticating the mobile terminal may also be carried, together with the first instruction information, in the first differential signal and transmitted to the sending device (or signal transmitter). The sending device (or signal transmitter) sends to the receiving device (or signal receiver) the first transmission signal that carries the first instruction information and the authentication information. Furthermore, parameter information related to the operation that needs to be performed by the receiving device (or signal receiver) may be further loaded in the first differential signal and the first transmission signal. For example, optionally, in the embodiment of this application, the step of generating, according to the acquired first differential signal, a first transmission signal that carries the first instruction information in the step S104 may include:

S502. According to the first differential signal, generate the first transmission signal that carries the first instruction information and the authentication information; or S504. According to the first differential signal, generate the first transmission signal that carries the first instruction information and the parameter information; or S506. According to the first differential signal, generate the first transmission signal that carries the first instruction information, the authentication information, and the parameter information.

In the foregoing step, the first differential signal further carries authentication information and/or parameter information. The authentication information is used by the receiving device (or signal receiver) to authenticate the mobile terminal, and is used by the receiving device (or signal receiver) to perform, after the authentication succeeds, an operation corresponding to the first instruction information. The parameter information includes one or more operation parameters that need to be acquired by the receiving device (or signal receiver) and correspond to the operation.

For example, for a scenario of a payment service, the authentication information may be a payment password of an account currently used by a paying user, and the parameter information may be an account ID of the account, such as an account number of an account or a card number of a bank card corresponding to the account. After the paying user confirms payment, the mobile terminal may output a first differential signal from a data transmission interface, where the first differential signal carries the payment password, the account ID, and the first instruction information, and the first instruction information is used to instruct a POS machine, which serves as a receiving device (or signal receiver), to perform a disbursement operation. Alternatively, the first differential signal carries the payment password, the account ID, and the first differential signal, where the first differential signal is used to instruct the sending device (or signal transmitter), which is connected to the data transmission interface, to send the second instruction information of the first instruction information. After acquiring any type of first differential signal, the sending device (or signal transmitter) may generate a first transmission signal according to the acquired first differential signal, and send the first transmission signal to the POS machine, where the first transmission signal carries the payment password, the account ID, and the first instruction information. Therefore, the POS machine may parse the received first transmission signal to obtain the payment password, the account ID and the first instruction information according to the received first transmission signal, and use the payment password and the account ID to complete the disbursement operation indicated by the first instruction information. Specifically, the POS machine may send a payment request to a payment service platform, where the payment request carries such parameters.

It should be understood that in the embodiment of this application in which authentication information or parameter information is mentioned, the first transmission signal should carry the first instruction information that serves a prompt purpose. However, for the authentication information and the parameter information, as mentioned above, the first transmission signal may carry both of them, or carry either of them separately. Correspondingly, the first differential signal may carry the first instruction information or carry the second instruction information, and may carry both the authentication information and the parameter information or carry either of them, which is not limited in this application. Further, for such information in the first differential signal and the first transmission signal, at least one piece of information in the signals may be encrypted and/or encoded concurrently or separately, so as to facilitate transmission of the signals and improve the security level of the light communications or sound wave communications solution.

Specifically, in the embodiment of this application, the encryption and/or encoding performed for the first transmission signal may be performed in at least one of the following manners:

1) If the first differential signal carries the first instruction information but does not carry the authentication information and the parameter information, the step of generating, according to the acquired first differential signal, the first transmission signal that carries the first instruction information in the step S104 may include:

S602. Acquire the first instruction information from the first differential signal.

S604. Generate the first transmission signal according to the acquired first instruction information; or encrypt and/or encode the acquired first instruction information, and generate the first transmission signal according to the encrypted and/or encoded first instruction information.

2) If the first differential signal carries the second instruction information but does not carry the first instruction information, the authentication information or the parameter information, the step of generating, according to the acquired first differential signal, the first transmission signal that carries the first instruction information in the step S104 may include:

S606. Acquire the first instruction information that is received beforehand or pre-stored locally.

S608. Generate the first transmission signal according to the acquired first instruction information; or encrypt and/or encode the acquired first instruction information, and generate the first transmission signal according to the encrypted and/or encoded first instruction information.

3) If the first differential signal carries the first instruction information and the authentication information but does not carry the parameter information, the step S502 may include:

S612. Acquire the first instruction information and the authentication information from the first differential signal.

S614. Generate the first transmission signal according to the acquired first instruction information and authentication information; or encrypt and/or encode the acquired first instruction information and/or authentication information, and generate the first transmission signal according to one of the following pieces of information: the first instruction information or the encrypted and/or encoded first instruction information, and the authentication information or the encrypted and/or encoded authentication information.

4) If the first differential signal carries the second instruction information and the authentication information but does not carry the first instruction information and the parameter information, the step S502 may include:

S616. Acquire the first instruction information that is received beforehand or pre-stored locally, and acquire the authentication information from the first differential signal.

S618. Generate the first transmission signal according to the acquired first instruction information and authentication information; or encrypt and/or encode the acquired first instruction information and/or authentication information, and generate the first transmission signal according to one of the following pieces of information: the first instruction information or the encrypted and/or encoded first instruction information, and the authentication information or the encrypted and/or encoded authentication information.

5) If the first differential signal carries the first instruction information and the parameter information but does not carry the authentication information, the step S504 may include:

S622. Acquire the first instruction information and the parameter information from the first differential signal.

S624. Generate the first transmission signal according to the acquired first instruction information and parameter information; or encrypt and/or encode the acquired first instruction information and/or parameter information, and generate the first transmission signal according to the following information: the first instruction information or the encrypted and/or encoded first instruction information, and the parameter information or the encrypted and/or encoded parameter information.

6) If the first differential signal carries the second instruction information and the parameter information but does not carry the first instruction information or the authentication information, the step S504 may include:

S626. Acquire the first instruction information that is received beforehand or pre-stored locally, and acquire the parameter information from the first differential signal.

S628. Generate the first transmission signal according to the acquired first instruction information and parameter information; or encrypt and/or encode the acquired first instruction information and/or parameter information, and generate the first transmission signal according to the following information: the first instruction information or the encrypted and/or encoded first instruction information, and the parameter information or the encrypted and/or encoded parameter information.

7) If the first differential signal carries the first instruction information, the authentication information and the parameter information, the step S506 may include:

S632. Acquire the first instruction information, the authentication information and the parameter information from the first differential signal.

S634. Generate the first transmission signal according to the acquired first instruction information, authentication information and parameter information; or encrypt and/or encode at least one of following: the acquired first instruction information, authentication information, and parameter information, and generate the first transmission signal according to the following information: the authentication information or the encrypted and/or encoded authentication information, the parameter information or the encrypted and/or encoded parameter information, and the first instruction information or the encrypted and/or encoded first instruction information.

8) If the first differential signal carries the second instruction information, the authentication information and the parameter, but does not carry the first instruction information, the step S506 may include:

S636. Acquire the first instruction information that is received beforehand or pre-stored locally, and acquire the authentication information and the parameter information from the first differential signal.

S638. Generate the first transmission signal according to the acquired first instruction information, authentication information and parameter information; or encrypt and/or encode at least one of following: the acquired first instruction information, authentication information, and parameter information, and generate the first transmission signal according to the following information: the authentication information or the encrypted and/or encoded authentication information, the parameter information or the encrypted and/or encoded parameter information, and the first instruction information or the encrypted and/or encoded first instruction information.

With reference to the description about the encryption and/or encoding processing performed in the foregoing 8 different scenarios, this application gives a practicable solution to sending of the first transmission signal. Further, in some embodiments of this application, the mobile terminal may also encrypt the first differential signal output from the data transmission interface and the first/second instruction information in the first differential signal, and/or the authentication information and/or the parameter information beforehand. In an optional manner, the first instruction information includes one or more encrypted instruction codes, and/or the authentication information includes one or more encrypted authentication codes, and/or the parameter information includes one or more encrypted numerical codes.

In the foregoing embodiment, there may be a plurality of practicable encryption manners and encoding manners. For example, in some embodiments of this application, the encryption manner may be an Advanced Encryption Standard (AES) algorithm, and the encoding manner may be a non return zero (NRZ) code, and prepared codes are grouped. For the first transmission signal, the digit 0 in each group may represent an off state of an indicator, and the digit 1 may represent an on state of the indicator. An interval between the digit 0 and the digit 1 is an intra-group time interval, and an interval between groups is an inter-group time interval. In a transmission process, the inter-group time interval may be set to be greater than the intra-group time interval, so as to distinguish a valid signal from an invalid interval, which facilitates elimination of misreading on the one hand, and on the other hand, facilitates receiving and decoding performed by an authentication device for the first transmission signal, where the misreading is caused by possible signal inversion between grouped signals, and the authentication device is located on a peer end.

Certainly, this is merely an example. In an embodiment of this application, different encryption and encoding combinations may be applied. For example, in some embodiments of this application, an encoding manner of a Non Return Zero Inverting (NRZI) code may be applied, or a Manchester encoding manner may be applied, which is not limited in this application.

On the basis of the foregoing description, the following describes some specific applications of the method for sending instruction information with reference to embodiments.

First, considering possible attenuation and interference problems of a transmission signal in an actual application scenario, both a sending device (or signal transmitter) and a receiving device (or signal receiver) may be set to accomplish the following effect: A corresponding function design is enabled only when they approach each other within a specified distance range. For example, in an embodiment of this application, for the sending device (or signal transmitter), the step S102 may include:

S702. Acquire the first differential signal if a recognition signal indicating that the distance between the mobile terminal and the receiving device (or signal receiver) is smaller than a preset distance threshold is received; and/or S704. Acquire the first differential signal if a trigger signal sent by the receiving device (or signal receiver) is received.

The sending device (or signal transmitter) may start to acquire the first differential signal after receiving the recognition signal. The recognition signal may be a signal that is sent by the receiving device (or signal receiver) and indicates that the distance between the mobile terminal or the sending device (or signal transmitter) and the receiving device (or signal receiver) is smaller than a preset distance threshold. Similar to the manner used by the receiving device (or signal receiver) to return the third instruction information, the manner used by the receiving device (or signal receiver) to send the recognition signal may be radio, visible light, or invisible light, such as infrared light. The receiving device (or signal receiver) may simply send an infrared signal that has a specified power and can be recognized by the sending device (or signal transmitter), and use the infrared signal as a recognition signal. With propagation of the infrared signal, strength of the signal decreases with increase of the distance between the sending device (or signal transmitter) and the receiving device (or signal receiver). When the strength of the infrared signal decreases to lower than a strength threshold, it is hardly probable that the sending device (or signal transmitter) connected to the mobile terminal and located in this distance can recognize the recognition signal, and therefore, the sending device (signal transmitter) beyond this distance generally does not start acquisition of the first differential signal and subsequent sending of the first transmission signal, thereby reducing power consumption of the sending device (or signal transmitter) properly. Further, after recognizing the recognition signal sent by the receiving device (or signal receiver), the sending device (or signal transmitter) may further notify the mobile terminal of the state information through a data transmission interface, so that the mobile terminal can indicate the state to the user. For example, an "available" flag is displayed on a screen of the mobile terminal, or an indicator is turned on, so that the user can start subsequent operations as indicated. In another aspect, the sending device (or signal transmitter) may receive a trigger signal sent by the receiving device (or signal receiver), where the trigger signal may carry a trigger instruction, so that the sending device (or signal transmitter) transmits an instruction to the mobile terminal after recognizing the trigger instruction, where the instruction indicates that the sending device (or signal transmitter) is in a "ready-to-send state".

In another aspect, in some embodiments of this application, the receiving device (or signal receiver) may send description information of an operation that the receiving device (or signal receiver) is ready to perform and corresponds to the first instruction information to the sending device (or signal transmitter) beforehand. In this way, the sending device (or signal transmitter) may notify the mobile terminal and the user of the mobile terminal of the description information of the operation, so that the user may understand, according to the description information of the operation, specific content of the operation that the receiving device (or signal receiver) is ready to perform, for example, a payment sum in a payment service, a payer name corresponding to the payment request, and the like. Therefore, on the one hand, the user can confirm the relevant service conveniently, and on the other hand, the operation at the end of the user can be simplified to selection of "yes" or "no" or the like or multiple choice, thereby bringing better operation experience to the user. In other words, in an embodiment of this application, before the step S102, the sending method may further include:

S802. Receive first instruction information and/or operation description information of an operation corresponding to the first instruction information.

S804. If the first instruction information is received, temporarily store the received first instruction information locally; and/or S806. If the operation description information is received, transmit the operation description information to a mobile terminal, so that the mobile terminal indicates the operation description information to a user, and so that the mobile terminal generates the first instruction information and/or second instruction information according to input information of the user and/or the operation description information.

In a specific application scenario of this application, the operation description information may include at least one of the following: code information, time information, address information, user information, account information, commodity information, and payment information. The payment information may include at least one of the following: an operation of sending a payment request to a payment service platform; and the operation description information may include at least one of the following: a serial number of the payment request, time information of the payment request, site information corresponding to the payment request, a payment sum corresponding to the payment request, an account ID corresponding to the payment request, account balance information corresponding to the payment request, a payer name corresponding to the payment request, and goods information, magnetic track information, and card number information corresponding to the payment request. Further, in the foregoing scenario, the operation corresponding to the first instruction information may include: sending an operation instruction corresponding to the operation description information to a local or third-party platform, where the third-party platform includes at least one of the following: a payment management platform, a bonus points management platform, and a logistics management platform.

In another aspect, in an embodiment of this application, the first instruction information and/or the second instruction information may also include voice information input by a first user into the mobile terminal. For example, the user may narrate an instruction orally, and the mobile terminal may recognize that the orally narrated instruction is the corresponding first instruction information and/or second instruction information, and the orally narrated instruction is added into the first differential signal and transmitted to the sending device (or signal transmitter). Specifically, in some embodiments of this application, for voice information that serves as the first instruction information, the operation indicated by the voice information may also be to recover the voice information itself by the receiving device (or signal receiver), thereby forming a mechanism of transmitting voice information. For example, in an embodiment, the sending device (or signal transmitter) may also send the instruction orally narrated by the user on the mobile terminal, or the orally narrated instruction together with the authentication information and the parameter information to the receiving device (or signal receiver) by using the first transmission signal, and the receiving device (or signal receiver) may recover the orally narrated instruction and send it to a person at the end of the receiving device (or signal receiver). In addition, in other embodiments, the mechanism of transmitting voice information may also be applied to a voice session that uses the light communication or sound wave communication mode, and the like, which is not limited in this application.

From the foregoing description, it can be seen that in the embodiment of this application, the operation corresponding to the first instruction information, which is mentioned above in the method for sending instruction information, may include at least one of the following: 1) an operation of outputting an unlock signal to an unlock device; 2) an operation of sending a payment request to a payment service platform; and 3) an operation of outputting the voice information to a second user, where the voice information is recovered from the first transmission signal, and the first instruction information and/or the second instruction information includes the voice information input by the first user into the mobile terminal. However, it should be understood that any variation of the technical solution of this application and equivalent implementation manners thereof shall also fall within the protection scope of this application.

It should be noted that in the embodiment of this application, the receiving device (or signal receiver) may also be formed by another mobile terminal, and therefore, the communication mode may also be performed between two mobile terminals, in which one mobile terminal may be connected to the sending device (or signal transmitter) of instruction information, and the other mobile terminal may serve as a receiving device (or signal receiver) to respond to the former. Still further, a sending function and a receiving function may be set on the two separately, and communications between the two may be not limited to unidirectional sending or receiving, but they serve as two symmetric communication terminals, and a role of either of them may be set and adjusted by setting the communication mode.

It should be noted that the technical solution of this application may be used together with other existing or future technical solutions that are practicable. For example, in the embodiment of this application, data transmission between the sending device (or signal transmitter) and the mobile terminal may also be performed with reference to other processing logics loaded on the mobile terminal, and other functions such as a user recognition mechanism and a conversation mechanism may be built-in or installed on the mobile terminal. In this way, involved processes can be implemented by inserting such functions between any steps in the communication mode according to design requirements. For example, in an embodiment, the mobile terminal may first require the user to provide identity recognition information such as a verification code, a voice password, a fingerprint, an inter-pupil distance, a facial image. The mobile terminal opens the data transmission interface or starts the push of the differential signal to the data transmission interface only after the mobile terminal verifies the identity recognition information successfully and recognizes that the user is a valid user. That is, in the embodiment of this application, the sending device (or signal transmitter) may combine with the mobile terminal to implement other functions or fulfill design requirements of higher security levels.

In summary, according to the method provided in the embodiment of this application, for an implementation environment formed by different types of mobile terminals and their receiving devices (or signal receivers), at least the following effects can be accomplished:

1) This application is widely applicable to intelligent terminals with a data transmission interface, such as tablet computers, notebook computers, and personal computers;

2) By means of the adaptation terminal, bidirectional communications can be implemented between a mobile terminal and an intelligent terminal such as a tablet computer, a notebook computer, and a personal computer to implement information transmission;

3) By access of a light adaptation terminal with a data transmission interface, authentication functions such as real-name authentication and mobile payment can be implemented on a mobile phone, a tablet computer, a notebook computer, and a personal computer;

4) A light adaptation terminal with a data transmission interface may serve as a startup authentication tool of a computer terminal, thereby avoiding traditional manual input of a password and providing higher confidentiality and security than a traditional manner; and 5) A light adaptation terminal with a data transmission interface may be used to establish a communications medium between intelligent terminals such as a mobile phone, a tablet computer, a notebook computer, and a personal computer, and implement transmission of information such as files.

Embodiment 2

Figure 2:
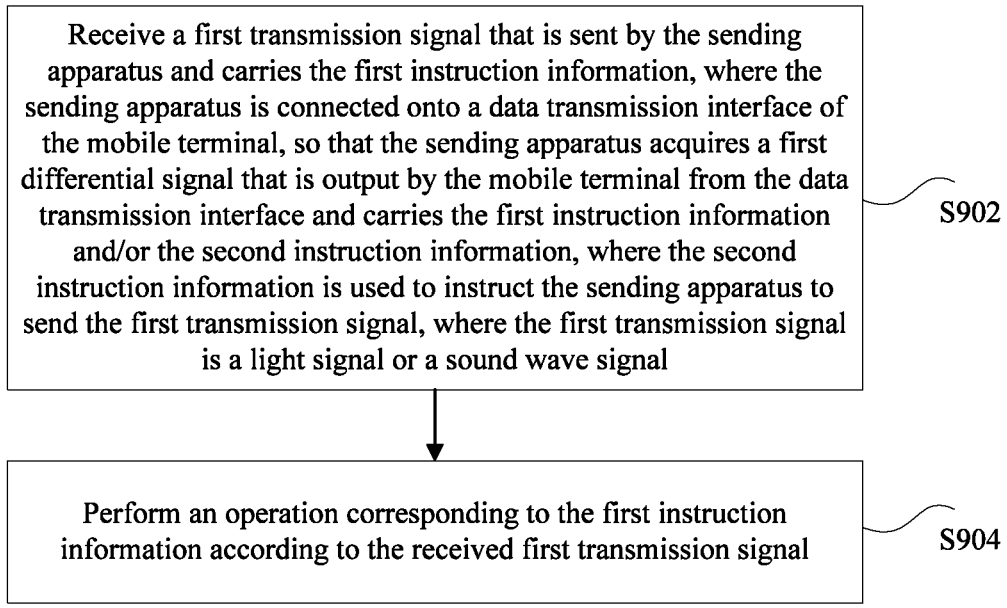
FIG. 2 is a schematic diagram of an optional method for receiving instruction information according to an embodiment of this application.

According to the embodiment of this application, a method for receiving instruction information, which corresponds to the method for sending instruction information in Embodiment 1, is provided. As shown in FIG. 2, the receiving method includes:

S902. Receive a first transmission signal that is sent by a sending device (or signal transmitter) and carries first instruction information, where the sending device (or signal transmitter) is connected to a data transmission interface of a mobile terminal, so that the sending device (or signal transmitter) acquires a first differential signal that is output by the mobile terminal from the data transmission interface and carries the first instruction information and/or second instruction information. The second instruction signal is used to instruct the sending device (or signal transmitter) to send a first transmission signal, and the first transmission signal is a light signal or a sound wave signal.

This application may provide an adaptation device of a mobile terminal. The adaptation device may include a data transmission interface component and a signal receiver. In an implementation process of the step S902, the data transmission interface component in the adaptation device, which is connected to a data transmission interface of the mobile terminal, may be used to acquire and output a first differential signal that is output from the data transmission interface.

S904. Perform an operation corresponding to the first instruction information according to the received first transmission signal.

In the implementation process of the step S904, a signal receiver in the adaptation device, which is connected to the data transmission interface component, may be used to receive a sound wave signal or a light wave signal, and convert the received sound wave signal or light wave signal into an electrical signal.

Optionally, in the embodiment of this application, before the step S902, the receiving method may further include:

S1002. Receive a second transmission signal that is sent by the sending device (or signal transmitter) and carries authentication information, where the second transmission signal is a light signal or a sound wave signal.

S1004. Return third instruction information to the sending device (or signal transmitter) according to the received second transmission signal, so that the sending device (or signal transmitter) acquires the first differential signal after receiving the returned third instruction information, or so that the sending device (or signal transmitter) receives and verifies the returned third instruction information and acquires the first differential signal after the verification succeeds.

In a preferred embodiment provided in this application, the adaptation device of the mobile terminal may further include a processor connected between the data transmission interface component and the signal receiver. The processor is configured to generate and output a differential signal according to the electrical signal input by the signal receiver.

Preferably, the signal receiver may be a sound wave receiver or a light wave receiver. The sound wave receiver is configured to receive at least one of an infrasonic wave, an audible wave, and an ultrasonic wave. The light wave receiver is configured to receive at least one of infrared light, visible light, and ultraviolet light.

Preferably, the data transmission interface (or data transmission interface component) may be a USB interface. For example, it may include at least one of the following: an USB interface, a mini USB interface, a micro USB interface, and a Dock interface.

Further, in the embodiment of this application, the step S1002 may include:

generating the third instruction information according to a preset rule and according to the authentication information acquired from the second transmission signal, where the third instruction information matches the authentication information, and returning the generated third instruction information to the sending device (or signal transmitter).

Optionally, in the embodiment of this application, before the step S902, the receiving method may further include:

S1102. Send operation description information of an operation corresponding to the first instruction information to the sending device (or signal transmitter) or the mobile terminal, so that the mobile terminal indicates the operation description information to a user, and so that the mobile terminal generates the first instruction information and/or second instruction information according to input information of the user and/or the operation description information.

Specifically, the operation description information may include at least one of the following: code information, time information, address information, user information, account information, commodity information, and payment information. The payment information may include at least one of the following: an operation of sending a payment request to a payment service platform; and the operation description information may include at least one of the following: a serial number of the payment request, time information of the payment request, site information corresponding to the payment request, a payment sum corresponding to the payment request, an account ID corresponding to the payment request, account balance information corresponding to the payment request, a payer name corresponding to the payment request, and goods information, magnetic track information, and card number information corresponding to the payment request. Further, in the foregoing scenario, the operation corresponding to the first instruction information may include: sending an operation instruction corresponding to the operation description information to a local or third-party platform, where the third-party platform includes at least one of the following: a payment management platform, a bonus points management platform, and a logistics management platform.

In addition, in an embodiment of this application, the first instruction information and/or the second instruction information may also include voice information input by a first user into the mobile terminal. For example, the user may narrate an instruction orally, and the mobile terminal may recognize that the orally narrated instruction is the corresponding first instruction information and/or second instruction information, and the orally narrated instruction is added into the first differential signal and transmitted to the sending device (or signal transmitter). Specifically, in some embodiments of this application, for voice information that serves as the first instruction information, the operation indicated by the voice information may also be to recover the voice information itself by the receiving device (or signal receiver), thereby forming a mechanism of transmitting voice information. For example, in an embodiment, the sending device (or signal transmitter) may also send the instruction orally narrated by the user on the mobile terminal, or the orally narrated instruction together with the authentication information and the parameter information to the receiving device (or signal receiver) by using the first transmission signal, and the receiving device (or signal receiver) may recover the orally narrated instruction and send it to a person at the end of the receiving device (or signal receiver). In addition, in other embodiments, the mechanism of transmitting voice information may also be applied to a voice session that uses the light communication or sound wave communication mode, and the like, which is not limited in this application.

From the foregoing description, it can be seen that in the embodiment of this application, the operation corresponding to the first instruction information, which is mentioned above in the method for sending instruction information, may include at least one of the following: 1) an operation of outputting an unlock signal to an unlock device; 2) an operation of sending a payment request to a payment service platform; and 3) an operation of outputting the voice information to a second user, where the voice information is recovered from the first transmission signal. The first instruction information and/or the second instruction information includes the voice information input by the first user into the mobile terminal. However, it should be understood that any variation of the technical solution of this application and equivalent implementation manners thereof shall also fall within the protection scope of this application.

It should be noted that in the embodiment of this application, the receiving device (or signal receiver) may also be another mobile terminal, and therefore, the communication mode may also be performed between two mobile terminals, in which one mobile terminal may be connected to the sending device (or signal transmitter) of instruction information, and the other mobile terminal may serve as a receiving device (or signal receiver) to respond to the former. Still further, a sending function and a receiving function may be set on the two separately, and communications between the two may be not limited to unidirectional sending or receiving, but they serve as two symmetric communication terminals, and a role of either of them may be set and adjusted by setting the communication mode.

In summary, according to the method provided in the embodiment of this application, for an implementation environment formed by different types of mobile terminals and their receiving devices (or signal receivers), at least the following effects can be accomplished:

1) This application is widely applicable to intelligent terminals with a data transmission interface, such as tablet computers, notebook computers, and personal computers;

2) By means of the adaptation terminal, bidirectional communications can be implemented between a mobile terminal and an intelligent terminal such as a tablet computer, a notebook computer, and a personal computer to implement information transmission;

3) By access of a light adaptation terminal with a data transmission interface, authentication functions such as real-name authentication and mobile payment can be implemented on a mobile phone, a tablet computer, a notebook computer, and a personal computer;

4) A light adaptation terminal with a data transmission interface may serve as a startup authentication tool of a computer terminal, thereby avoiding traditional manual input of a password and providing higher confidentiality and security than a traditional manner; and 5) A light adaptation terminal with a data transmission interface may be used to establish a communications medium between intelligent terminals such as a mobile phone, a tablet computer, a notebook computer, and a personal computer, and implement transmission of information such as files.

It should be noted that in the embodiment of this application, the optical signal may include at least one of the following: a visible light signal, an infrared light signal, and an ultraviolet light signal; and the sound wave signal includes at least one of the following: an infrasonic wave, an audible sound wave, and an ultrasonic wave.

Embodiment 3

Figure 3:
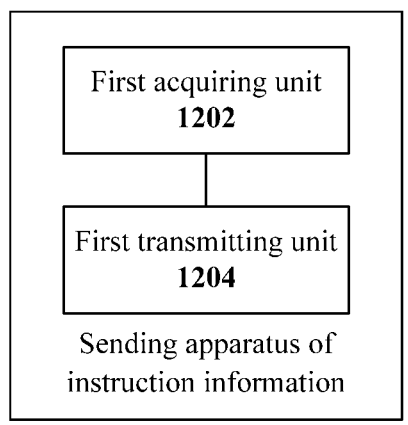
FIG. 3 is a schematic diagram of an optional device for sending instruction information according to an embodiment of this application.

According to the embodiment of this application, a sending device (or signal transmitter) of instruction information, which is used to implement the sending method described in Embodiment 1, is provided. As shown in FIG. 3, the sending device (or signal transmitter) includes:

1) a first acquiring unit 1202, configured to acquire a first differential signal that is output from a data transmission interface of a mobile terminal and carries first instruction information and/or second instruction information, where the first instruction information is used to instruct a receiving device (or signal receiver) to perform an operation corresponding to the first instruction information, and the second instruction information is used to instruct to send the first instruction information to the receiving device (or signal receiver).

2) a first transmitting unit 1204, configured to generate, according to the acquired first differential signal, a first transmission signal that carries the first instruction information, and send the first transmission signal to the receiving device (or signal receiver), where the first transmission signal is a light signal or a sound wave signal.

It should be understood that one of problem that the technical solution of this application intends to solve is to provide a device for transmitting instruction information from a mobile terminal to a receiving device (or a signal receiver), where the instruction information may be used to instruct the receiving device (or signal receiver) to perform an operation corresponding to the instruction information. In this way, by performing the operation on the mobile terminal on one end, a user can instruct the receiving device (or signal receiver) to perform one or more corresponding operations. Specifically, a plurality of operations may be performed by the receiving device (or signal receiver), and will be described in detail in subsequent embodiments of this application, which is not limited by this application. For ease of description, the instruction information is hereinafter referred to as first instruction information.

Multiple solutions to this problem are available in the prior art. For example, in a traditional mobile terminal application, the solution may be implemented in the following manner: The mobile terminal may use a built-in radio transmitting module and use an electromagnetic wave to carry and send the first instruction information. Alternatively, for a mobile terminal that uses a light communications mode, in order to overcome the problem brought by the preceding manner, the following manner may be applied: The mobile terminal may use a camera flash or the like and use visible light to carry and send the first instruction information to the receiving device (or signal receiver). However, for the latter manner, because light transmitting modules such as camera flashes that are built in the mobile terminals produced by different vendors have different specifications, different light communication solutions need to be designed to match the mobile terminals of different specifications. In other words, the following defect is caused: One type of sending device (or signal transmitter) of instruction information is hardly compatible with a mobile terminal of a different model.

To overcome the defect, in the first acquiring unit 1202 in a sending device (or signal transmitter) of instruction information according to an embodiment of this application, a differential signal that is output from a data transmission interface of the mobile terminal and carries the first instruction information may be acquired, where the first instruction information is used to instruct a receiving device (or signal receiver) to perform an operation corresponding to the first instruction information.

Different from the prior art, in the embodiment of this application, the first instruction information is no longer sent by a built-in module or device in an existing mobile terminal to the receiving device (or signal receiver). Instead, a differential signal output through a data transmission interface of the mobile terminal is transmitted to a sending device (or signal transmitter) connected to the data transmission interface, and then sent by the sending device (or signal transmitter) to the receiving device (or signal receiver) in a light communication manner or a sound wave communications manner. In this process, because the mobile terminals produced by all vendors have relatively consistent designs on the data transmission interface and the manner of outputting the differential signal through the data transmission interface, for the sending device (or signal transmitter), the same or similar solutions may be applied to both the design on a physical connection to the data transmission interface and the design on acquisition and recognition of the differential signal output through the data transmission interface. In this way, the problem that the existing light communications mode is hardly compatible with a mobile terminal of a different model is overcome at the end of coupling with the mobile terminal. For ease of description, the differential signal that is output from a data transmission interface and carries the first instruction information is hereinafter referred to as a first differential signal.

Specifically, in the embodiment of this application, the manner of transmitting the first differential signal through the data transmission interface may be user-defined according to a wiring terminal of the data transmission interface. Preferably, the data transmission interface may be a USB interface. For example, it may include at least one of the following: a USB interface, a mini USB interface, a micro USB interface, and a Dock interface. For existing USB interfaces, interface definitions are generally the same. That is, four connection wires are generally disposed, which are: data positive, data negative, power supply, and ground, where an analog parameter difference between data positive and data negative constitutes the differential signal. In the embodiment of the present invention, the four connection wires may be used to implement sending and receiving of signals. For example, a power supply wire may be connected to a power supply module to provide electrical power for operation of a system, and data positive and data negative may be connected to a USB interface component in the sending device (or signal transmitter) to implement acquisition of the signals.

For the foregoing scenario, it should be noted that although the sending device (or signal transmitter) is an external module for the existing mobile terminal and is not a conventional design of the existing mobile terminal, it does not prevented that a designer implants the sending device (or signal transmitter) into the mobile terminal in a future design solution of the mobile terminal. From this perspective, the data transmission interface is not necessarily exposed outside the mobile terminal in a well-known manner, such as a data transmission interface on a housing of a mobile phone, but the data transmission interface may also be an interface that is disposed inside the mobile terminal, matches the implanted sending device (or signal transmitter) and is configured to output the first differential signal. Further, it should be understood that for both the existing data transmission interface disposed outside the mobile terminal and the data transmission interface that will possibly come forth in the future and will be disposed inside the mobile terminal, the specific shape and the specific material of the data transmission interface are diversified, which does not affect implementation of the technical solution of this application and fulfillment of technical effects of the technical solution, and this application does not limit the shape and the material in any way.

In another aspect, based on the same conception, in some embodiments of this application, the first differential signal acquired from the data transmission interface of the mobile terminal may not carry the first instruction information, but carry other instruction information that instructs the sending device (or signal transmitter) to send the first instruction information to the receiving device (or signal receiver). In this way, the first differential signal that carries the other instruction information may also be acquired in the first acquiring unit 1202. For ease of description, the other instruction information is hereinafter referred to as second instruction information.

For example, in an embodiment, the first differential signal may carry the first instruction information 00001, where 00001 may represent an instruction code. An operation corresponding to the instruction code, which the receiving device (or signal receiver) is instructed to perform, may be an unlock operation, or in other words, an unlock signal is sent to the unlock device. In another embodiment, the first differential signal may not carry the first instruction information 00001, but carry a binary bit such as 0 or 1 that is used to instruct to send the first instruction information to the receiving device (or signal receiver). In this scenario, the first instruction information 00001 to be sent may be pre-stored locally on the sending device (or signal transmitter) so that the sending device (or signal transmitter) responds to the first differential signal that carries the second instruction information and is acquired from the data transmission interface, and sends the first instruction information.

Certainly, the foregoing is merely an example for facilitating understanding of the technical solution of the present invention, and does not constitute any limitation on this application. For example, the first instruction information is not limited to the instruction code mentioned above, and may also be a binary bit, where a binary bit 1 instructs the receiving device (or signal receiver) to perform an operation, and a binary bit 0 instructs the receiving device (or signal receiver) to be on standby, or the like. In addition, in a scenario that the first differential signal carries the second instruction information but does not carry the first instruction information, the first instruction information may not be stored in a fixed storage area in the sending device (or signal transmitter), but the first instruction information sent by the receiving device (or signal receiver) is received temporarily before the first differential signal is acquired, and is written into a buffer or a register for invoking. For example, in a scenario related to a payment service, one end of light communications or sound wave communications is a mobile terminal held in a hand of a paying user, where a sending device (or signal transmitter) is mounted on a data transmission interface of the mobile terminal, and the other end is a point of sale POS machine that serves as a receiving device (or signal receiver) and is operated by a salesperson. Therefore, the salesperson may tell the paying user a payable sum in the payment service first, and at the same time, a disbursable sum corresponding to a disbursement operation that the POS machine is ready to perform is displayed on a user-oriented display screen of the POS machine, and the POS machine is controlled to send temporarily generated first instruction information corresponding to the disbursement operation to the sending device (or signal transmitter) on the mobile terminal. The paying user may press a key indicative of payment confirmation on the mobile terminal only after the paying user determines that the payable sum is reasonable and that the disbursable sum is consistent with the payable sum. In this way, the mobile terminal may generate, according to the user input, a first differential signal that carries second instruction information, and transmit the first differential signal to the sending device (or signal transmitter) through the data transmission interface. Further, the sending device (or signal transmitter) returns the first instruction information to the POS machine according to the second instruction information in the input first differential signal. Finally, the POS machine completes a sum disbursement operation according to the returned first instruction information. In the foregoing scenario, because the first instruction information is generated temporarily and is not easy to crack, a malicious action performed by cracking the first instruction information corresponding to the sum disbursement operation is restricted. In another aspect, because the first instruction information does not enter the mobile terminal, malicious software installed on the mobile terminal is prevented from stealing the first instruction information, and security of the payment service is further improved.

In addition, in some embodiments of this application, the first instruction information and the second instruction information may be used together. That is, in the first acquiring unit 1202, the first differential signal that carries both the first instruction information and the second instruction information may be acquired. In this scenario, the first instruction information and the second instruction information may come from different confirmation mechanisms. For example, the first instruction information corresponding to an unlock operation may come from confirmation of a user identity. For example, after determining that a user fingerprint acquired from a touchscreen of the mobile terminal matches a record in a fingerprint database, the mobile terminal may add the first instruction information into the first differential signal. The second instruction information may come from confirmation performed by the user for the unlock operation. For example, after the fingerprint of the user is recorded, the user touches or presses the same area on the touchscreen again, which may be recognized by the mobile terminal as a confirmation signal input by the user for confirming the unlock operation, and therefore, the mobile terminal also adds the second instruction information into the first differential signal, and transmits the first differential signal that carries both the first instruction information and the second instruction information to the sending device (or signal transmitter) through the data transmission interface. In this way, the sending device (or signal transmitter) may, according to the received first differential signal, send to the receiving device (or signal receiver) the first instruction information used to perform the unlock operation, so that the receiving device (or signal receiver) completes the unlock operation. In the foregoing scenario, two confirmation mechanisms are used together to complete the unlock operation ultimately, thereby improving reliability of the light communication or sound wave communication process.

On the basis of the foregoing description, according to the sending device (or signal transmitter) provided in the embodiment of this application, the communication mode described above or below, which is used for sending the first instruction information to the receiving device (or signal receiver), may be a light communication mode or a sound wave communication mode. That is, after the first differential signal that carries the first instruction information and/or the second instruction information is acquired by using the first acquiring unit 1202, a transmission signal that carries the first instruction information may be generated according to the acquired first differential signal in the first transmitting unit 1204, and the transmission signal may be sent to the receiving device (or signal receiver). The transmission signal may be a light signal or a sound wave signal. For ease of description, the transmission signal is hereinafter referred to as a first transmission signal.

In this way, in the embodiment of this application, the problem of compatibility of mobile terminals of different models is solved on the side of coupling between the sending device (or signal transmitter) and the mobile terminal, and light communications or sound wave communications are implemented between the sending device (or signal transmitter) and the receiving device (or signal receiver), and therefore, advantages of both aspects are exerted. In addition, because a task that needs to be performed by the sending device (or signal transmitter) has simple and intuitional logics, the structure of the sending device may be relatively simple, and manufacturing costs of the sending device are relatively low. Therefore, inconvenience of using the sending device (or signal transmitter) for implementing the foregoing sending method is generally avoided for the user.

In the foregoing embodiment, this application discloses a basic implementation manner, namely, a light communication or sound wave communication mode in which the first instruction information that instructs the receiving device (or signal receiver) to perform a corresponding operation is transmitted from the sending device (or signal transmitter) to the receiving device (or signal receiver). However, considering higher security level requirements and richer function design requirements, in the embodiment of the present invention, a function of authenticating the user of the mobile terminal may be implanted into the sending device (or signal transmitter) of instruction information. Specifically, authentication information for authenticating the user of the mobile terminal or the mobile terminal is sent in addition to the first instruction information to the receiving device (or signal receiver), where the authentication information may be sent together with the first instruction information to the receiving device (or signal receiver) by using the first transmission signal, or may be sent, before or after the first transmission signal, to the receiving device (or signal receiver) by another transmission signal, which is not limited in this application. However, both a sending logic of the first instruction information and a sending logic of the authentication information should correspond to a receiving and processing logic at the end of the receiving device (or signal receiver). Obviously unreasonable extensions and expansions for this application shall not be regarded as limitations on this application.

Specifically, in one of practicable implementation manners, before the first acquiring unit 1202, the sending device (or signal transmitter) may include:

1) a second acquiring unit, configured to acquire a second differential signal that is output from the data transmission interface and carries authentication information, where the authentication information is used to authenticate the mobile terminal;

2) a second transmitting unit, configured to generate, according to the acquired second differential signal, a second transmission signal that carries the authentication information, and send the second transmission signal to the receiving device (or signal receiver), where the receiving device (or signal receiver) returns the third instruction information according to the authentication information. The second transmission signal is a light signal or a sound wave signal.

The first acquiring unit 1202 may include a first acquiring module, configured to acquire the first differential signal when the third instruction information is received.

In the embodiment of this application, before acquiring the first differential signal and starting the operation of sending the first transmission signal to the receiving device (or signal receiver) by using the first acquiring unit 1202 or the first acquiring module, the sending device (or signal transmitter) may first receive the second differential signal that is transmitted by the mobile terminal through the data transmission interface and carries the authentication information, and send to the receiving device (or signal receiver) the second transmission signal that carries the authentication information, so that the receiving device (or signal receiver) authenticates the mobile terminal, and further, the sending device (or signal transmitter) may, after receiving the third instruction information returned by the receiving device (or signal receiver) after the authentication succeeds, perform in the first acquiring module an operation of acquiring the first differential signal, where the second transmission signal may also be a light signal or a sound wave signal.

Specifically, in the embodiment of this application, the second transmission signal and the first transmission signal may share a same signal generator or may be generated by different signal generators. For example, in an embodiment, the first transmission signal may be a visible light signal transmitted by a visible light signal generator, and the second transmission signal may be an infrared light signal transmitted by an infrared light signal generator. It should be noted that the light signal mentioned in the foregoing or following embodiments of this application may include at least one of the following: a visible light signal, an infrared light signal, and an ultraviolet light signal, which is not limited in this application. All implementation manners based on such applications shall fall within the protection scope of this application.

In the foregoing scenario, the task of "the receiving device (or signal receiver) authenticates the mobile terminal" is performed before the task of "the mobile terminal sends the first instruction information to the receiving device (or signal receiver) by using the sending device (or signal transmitter) so that the receiving device (or signal receiver) performs the corresponding operation", so that the receiving device (or signal receiver) may perform the indicated operation after confirming legality of the mobile terminal and the user of the mobile terminal, which improves security of the light communications or sound wave communications solution. The manner used by the receiving device (or signal receiver) to return the third instruction information to the sending device (or signal transmitter) may be a communication mode of radio, visible light, or invisible light. For example, the third instruction information may be carried by infrared light, and therefore, on the one hand, advantages of a compact structure and low power consumption of an infrared receiving module can be exerted, and on other hand, visual interference caused to the user of the mobile terminal is avoided, where the visual interference is caused when the third instruction information is returned by using visible light.

Considering higher security level requirements, in another practicable implementation manner in an embodiment of this application, before the first acquiring unit 1202, the sending device (or signal transmitter) may also include:

1) a second acquiring unit, configured to acquire a second differential signal that is output from the data transmission interface and carries authentication information, where the authentication information is used to authenticate the mobile terminal, so that the receiving device (or signal receiver) returns third instruction information according to the authentication information.

2) a second transmitting unit, configured to generate, according to the acquired second differential signal, a second transmission signal that carries the authentication information, and send the second transmission signal to the receiving device (or signal receiver) The receiving device (or signal receiver) returns the third instruction information according to the authentication information The second transmission signal is a light signal or a sound wave signal.

The first acquiring unit 1202 includes a verifying module, configured to receive and verify the third instruction information; and a second acquiring module, configured to acquire the first differential signal after the verification succeeds.

Compared with the preceding implementation manner, this embodiment differs in that the verifying module and the second acquiring module replace the first acquiring module. In other words, in this embodiment, after receiving the third instruction information indicating that the receiving device (or signal receiver) authenticates the mobile terminal successfully, the sending device (or signal transmitter) does not directly acquire the first differential signal and start the subsequent operations of generating and sending the first transmission signal, but verifies the returned third instruction information first and then starts to acquire the first differential signal after the verification succeeds. In the foregoing scenario, by means of confirming twice, reliability of the light communication or sound wave communication are improved on the one hand, and on the other hand, a more complicated authentication logic may be further integrated in this embodiment. For example, in an instance of this application, the authentication information pre-allocated to the mobile terminal is not the authentication information itself, but is an encryption algorithm. The authentication information may include a random code generated by the mobile terminal, and a first code value obtained by the mobile terminal by processing the random code according to the encryption algorithm. After receiving the random code carried in the second transmission signal sent by the sending device (or signal transmitter), the receiving device (or signal receiver) may obtain a second code value by processing the random code according to the same encryption algorithm, and return the second code value as the third instruction information to the sending device (or signal transmitter). Subsequently, if the returned second code value is consistent with the first code value in the authentication information, it is deemed that the verification succeeds, and the operation of acquiring the first differential signal is performed by using the second acquiring module; otherwise, it is deemed that the verification fails. In other words, in the embodiment of this application, the verifying module may include:

1) a determining submodule, configured to receive the third instruction information, and determine whether the received third instruction information matches the authentication information, and when the received third instruction information matches the authentication information, determine that the verification succeeds.

In the foregoing scenario, because the authentication information is not fixed, and thus is not easy to crack, which further improves security of the light communications or sound wave communications solution. Certainly, the foregoing is merely an example. In other embodiments of this application, there may be multiple manners of matching between the third instruction information and the authentication information, other verification manners may be applied, the verification processing for the returned third instruction information may be performed not on the sending device (or signal transmitter), but on the mobile terminal, and so on, which is not described repeatedly in this application.

Apart from the foregoing implementation manner, in an embodiment of this application, the first instruction information itself may also be authentication information. After receiving the first instruction information or authentication information, the receiving device (or signal receiver) may authenticate the mobile terminal or the user of the mobile terminal according to the authentication information, and after the authentication succeeds, perform a corresponding operation, for example, a preset operation corresponding to this type of authentication information, or the like.

In addition, the authentication information used for authenticating the mobile terminal may also be carried, together with the first instruction information, in the first differential signal and transmitted to the sending device (or signal transmitter). The sending device (or signal transmitter) sends to the receiving device (or signal receiver) the first transmission signal that carries the first instruction information and the authentication information. Furthermore, parameter information related to the operation that needs to be performed by the receiving device (or signal receiver) may be further loaded in the first differential signal and the first transmission signal. For example, optionally, in the embodiment of this application, the first transmitting unit 1204 may include:

1) a first transmitting module, configured to generate, according to the first differential signal, the first transmission signal that carries the first instruction information and the authentication information; or 2) a second transmitting module, configured to generate, according to the first differential signal, the first transmission signal that carries the first instruction information and the parameter information; or 3) a third transmitting module, configured to generate, according to the first differential signal, the first transmission signal that carries the first instruction information, the authentication information and the parameter information.

In the foregoing step, the first differential signal further carries authentication information and/or parameter information The authentication information is used by the receiving device (or signal receiver) to authenticate the mobile terminal, and is used by the receiving device (or signal receiver) to perform, after the authentication succeeds, an operation corresponding to the first instruction information The parameter information includes one or more operation parameters that need to be acquired by the receiving device (or signal receiver) and correspond to the operation.

For example, for a scenario of a payment service, the authentication information may be a payment password of an account currently used by a paying user, and the parameter information may be an account ID of the account, such as an account number of an account or a card number of a bank card corresponding to the account. After the paying user confirms payment, the mobile terminal may output a first differential signal from a data transmission interface, where the first differential signal carries the payment password, the account ID, and the first instruction information, and the first instruction information is used to instruct a POS machine, which serves as a receiving device (or signal receiver), to perform a disbursement operation. Alternatively, the first differential signal carries the payment password, the account ID, and the first differential signal, where the first differential signal is used to instruct the sending device (or signal transmitter), which is connected to the data transmission interface, to send the second instruction information of the first instruction information. After acquiring any type of first differential signal, the sending device (or signal transmitter) may generate a first transmission signal according to the acquired first differential signal, and send the first transmission signal to the POS machine, where the first transmission signal carries the payment password, the account ID, and the first instruction information. Therefore, the POS machine may parse the received first transmission signal to obtain the payment password, the account ID and the first instruction information according to the received first transmission signal, and use the payment password and the account ID to complete the disbursement operation indicated by the first instruction information. Specifically, the POS machine may send a payment request to a payment service platform, where the payment request carries such parameters.

It should be understood that in the embodiment of this application in which authentication information or parameter information is mentioned, the first transmission signal should carry the first instruction information that serves a prompt purpose. However, for the authentication information and the parameter information, as mentioned above, the first transmission signal may carry both of them, or carry either of them separately. Correspondingly, the first differential signal may carry the first instruction information or carry the second instruction information, and may carry both the authentication information and the parameter information or carry either of them, which is not limited in this application. Further, for such information in the first differential signal and the first transmission signal, at least one piece of information in the signals may be encrypted and/or encoded concurrently or separately, so as to facilitate transmission of the signals and improve the security level of the light communications or sound wave communications solution.

Specifically, in the embodiment of this application, the encryption and/or encoding performed for the first transmission signal may be performed in at least one of the following manners:

1) If the first differential signal carries the first instruction information but does not carry the authentication information or the parameter information, the first transmitting unit 1204 may include:

a first acquiring submodule, configured to acquire the first instruction information from the first differential signal; and a first processing submodule, configured to generate the first transmission signal according to the acquired first instruction information; or encrypt and/or encode the acquired first instruction information, and generate the first transmission signal according to the encrypted and/or encoded first instruction information.

2) If the first differential signal carries the second instruction information but does not carry the first instruction information, the authentication information or the parameter information, the first transmitting unit 1204 may include:

a second acquiring submodule, configured to acquire the first instruction information that is received beforehand and/or pre-stored locally; and a second processing submodule, configured to generate the first transmission signal according to the acquired first instruction information; or encrypt and/or encode the acquired first instruction information, and generate the first transmission signal according to the encrypted and/or encoded first instruction information.

3) If the first differential signal carries the first instruction information and the authentication information but does not carry the parameter information, the first transmitting module may include:

a third acquiring submodule, configured to acquire the first instruction information and the authentication information from the first differential signal; and a third processing submodule, configured to generate the first transmission signal according to the acquired first instruction information and authentication information; or encrypt and/or encode the acquired first instruction information and/or authentication information, and generate the first transmission signal according to one of the following pieces of information: the first instruction information or the encrypted and/or encoded first instruction information, and the authentication information or the encrypted and/or encoded authentication information.

4) If the first differential signal carries the second instruction information and the authentication information but does not carry the first instruction information and the parameter information, the first transmitting module may include:

a fourth acquiring submodule, configured to acquire the first instruction information that is received beforehand or pre-stored locally, and acquire the authentication information from the first differential signal; and a fourth processing submodule, configured to generate the first transmission signal according to the acquired first instruction information and authentication information; or encrypt and/or encode the acquired first instruction information and/or authentication information, and generate the first transmission signal according to one of the following pieces of information: the first instruction information or the encrypted and/or encoded first instruction information, and the authentication information or the encrypted and/or encoded authentication information.

5) If the first differential signal carries the first instruction information and the parameter information but does not carry the authentication information, the second transmitting module may include:

a fifth acquiring submodule, configured to acquire the first instruction information and the parameter information from the first differential signal; and a fifth processing submodule, configured to generate the first transmission signal according to the acquired first instruction information and parameter information; or encrypt and/or encode the acquired first instruction information and/or parameter information, and generate the first transmission signal according to the following information: the first instruction information or the encrypted and/or encoded first instruction information, and the parameter information or the encrypted and/or encoded parameter information.

6) If the first differential signal carries the second instruction information and the parameter information but does not carry the first instruction information or the authentication information, the second transmitting module may include:

a sixth acquiring submodule, configured to acquire the first instruction information that is received beforehand or pre-stored locally, and acquire the parameter information from the first differential signal; and a sixth processing submodule, configured to generate the first transmission signal according to the acquired first instruction information and parameter information; or encrypt and/or encode the acquired first instruction information and/or parameter information, and generate the first transmission signal according to the following information: the first instruction information or the encrypted and/or encoded first instruction information, and the parameter information or the encrypted and/or encoded parameter information.

7) If the first differential signal carries the first instruction information, the authentication information and the parameter information, the third transmitting module may include:

a seventh acquiring submodule, configured to acquire the first instruction information, the authentication information and the parameter information from the first differential signal; and a seventh processing submodule, configured to generate the first transmission signal according to the acquired first instruction information, authentication information and parameter information; or encrypt and/or encode at least one of following: the acquired first instruction information, authentication information, and parameter information, and generate the first transmission signal according to the following information: the authentication information or the encrypted and/or encoded authentication information, the parameter information or the encrypted and/or encoded parameter information, and the first instruction information or the encrypted and/or encoded first instruction information.

8) If the first differential signal carries the second instruction information, the authentication information and the parameter, but does not carry the first instruction information, the third transmitting module may include:

an eighth acquiring submodule, configured to acquire the first instruction information that is received beforehand or pre-stored locally, and acquire the authentication information and the parameter information from the first differential signal; and an eighth processing submodule, configured to generate the first transmission signal according to the acquired first instruction information, authentication information and parameter information; or encrypt and/or encode at least one of following: the acquired first instruction information, authentication information, and parameter information, and generate the first transmission signal according to the following information: the authentication information or the encrypted and/or encoded authentication information, the parameter information or the encrypted and/or encoded parameter information, and the first instruction information or the encrypted and/or encoded first instruction information.

With reference to the description about the encryption and/or encoding processing performed in the foregoing 8 different scenarios, this application gives a practicable solution to sending of the first transmission signal. Further, in some embodiments of this application, the mobile terminal may also encrypt the first differential signal output from the data transmission interface and the first/second instruction information in the first differential signal, and/or the authentication information and/or the parameter information beforehand. In an optional manner, the first instruction information includes one or more encrypted instruction codes, and/or the authentication information includes one or more encrypted authentication codes, and/or the parameter information includes one or more encrypted numerical codes.

In the foregoing embodiment, there may be a plurality of practicable encryption manners and encoding manners. For example, in some embodiments of this application, the encryption manner may be an Advanced Encryption Standard (AES) algorithm, and the encoding manner may be a Non Return Zero (NRZ) code, and prepared codes are grouped. For the first transmission signal, the digit 0 in each group may represent an off state of an indicator, and the digit 1 may represent an on state of the indicator. An interval between the digit 0 and the digit 1 is an intra-group time interval, and an interval between groups is an inter-group time interval. In a transmission process, the inter-group time interval may be set to be greater than the intra-group time interval, so as to distinguish a valid signal from an invalid interval, which facilitates elimination of misreading on the one hand, and on the other hand, facilitates receiving and decoding performed by an authentication device for the first transmission signal, where the misreading is caused by possible signal inversion between grouped signals, and the authentication device is located on a peer end.

Certainly, this is merely an example. In an embodiment of this application, different encryption and encoding combinations may be applied. For example, in some embodiments of this application, an encoding manner of a Non Return Zero Inverting NRZI code may be applied, or a Manchester encoding manner may be applied, which is not limited in this application.

On the basis of the foregoing description, the following describes some specific applications of the sending device (or signal transmitter) of instruction information with reference to embodiments.

First, considering possible attenuation and interference problems of a transmission signal in an actual application scenario, both a sending device (or signal transmitter) and a receiving device (or signal receiver) may be set to accomplish the following effect: A corresponding function design is enabled only when they approach each other within a specified distance range. For example, in an embodiment of this application, for the sending device (or signal transmitter), the first acquiring unit 1202 may include:

1) a third acquiring module, configured to acquire the first differential signal when a recognition signal indicating that a distance between the mobile terminal and the receiving device (or signal receiver) is smaller than a preset distance threshold is received, and/or acquire the first differential signal when a trigger signal sent by the receiving device (or signal receiver) is received.

The sending device (or signal transmitter) may start to acquire the first differential signal after receiving the recognition signal. The recognition signal may be a signal that is sent by the receiving device (or signal receiver) and indicates that the distance between the mobile terminal or the sending device (or signal transmitter) and the receiving device (or signal receiver) is smaller than a preset distance threshold. Similar to the manner used by the receiving device (or signal receiver) to return the third instruction information, the manner used by the receiving device (or signal receiver) to send the recognition signal may be radio, visible light, or invisible light, such as infrared light. The receiving device (or signal receiver) may simply send an infrared signal that has a specified power and can be recognized by the sending device (or signal transmitter), and use the infrared signal as a recognition signal. With propagation of the infrared signal, strength of the signal decreases with increase of the distance between the sending device (or signal transmitter) and the receiving device (or signal receiver). When the strength of the infrared signal decreases to lower than a strength threshold, it is hardly probable that the sending device (or signal transmitter) connected to the mobile terminal and located in this distance can recognize the recognition signal, and therefore, the sending device (signal transmitter) beyond this distance generally does not start acquisition of the first differential signal and subsequent sending of the first transmission signal, thereby reducing power consumption of the sending device (or signal transmitter) properly. Further, after recognizing the recognition signal sent by the receiving device (or signal receiver), the sending device (or signal transmitter) may further notify the mobile terminal of the state information through a data transmission interface, so that the mobile terminal can indicate the state to the user. For example, an "available" flag is displayed on a screen of the mobile terminal, or an indicator is turned on, so that the user can start subsequent operations as indicated. In another aspect, the sending device (or signal transmitter) may receive a trigger signal sent by the receiving device (or signal receiver), where the trigger signal may carry a trigger instruction, so that the sending device (or signal transmitter) transmits an instruction to the mobile terminal after recognizing the trigger instruction, where the instruction indicates that the sending device (or signal transmitter) is in a "ready-to-send state".

In another aspect, in some embodiments of this application, the receiving device (or signal receiver) may send description information of an operation that the receiving device (or signal receiver) is ready to perform and corresponds to the first instruction information to the sending device (or signal transmitter) beforehand. In this way, the sending device (or signal transmitter) may notify the mobile terminal and the user of the mobile terminal of the description information of the operation, so that the user may understand, according to the description information of the operation, specific content of the operation that the receiving device (or signal receiver) is ready to perform, for example, a payment sum in a payment service, a payer name corresponding to the payment request, and the like. Therefore, on the one hand, the user can confirm the relevant service conveniently, and on the other hand, the operation at the end of the user can be simplified to selection of "yes" or "no" or the like or multiple choice, thereby bringing better operation experience to the user. In other words, in an embodiment of this application, the sending device (or signal transmitter) may further include:

1) a receiving unit, configured to receive the first instruction information and/or operation description information of an operation corresponding to the first instruction information.

2) a storing unit, configured to: when the first instruction information is received, temporarily store the received first instruction information locally; and/or 3) a third transmitting unit, configured to: when the operation description information is received, transmit the operation description information to the mobile terminal, so that the mobile terminal indicates the operation description information to a user, and so that the mobile terminal generates the first instruction information and/or the second instruction information according to input information of the user and/or the operation description information, where In a specific application scenario of this application, the operation description information may include at least one of the following: code information, time information, address information, user information, account information, commodity information, and payment information. The payment information may include at least one of the following: an operation of sending a payment request to a payment service platform; and the operation description information may include at least one of the following: a serial number of the payment request, time information of the payment request, site information corresponding to the payment request, a payment sum corresponding to the payment request, an account ID corresponding to the payment request, account balance information corresponding to the payment request, a payer name corresponding to the payment request, and goods information, magnetic track information, and card number information corresponding to the payment request. Further, in the foregoing scenario, the operation corresponding to the first instruction information may include: sending an operation instruction corresponding to the operation description information to a local or third-party platform, where the third-party platform includes at least one of the following: a payment management platform, a bonus points management platform, and a logistics management platform.

In another aspect, in an embodiment of this application, the first instruction information and/or the second instruction information may also include voice information input by a first user into the mobile terminal. For example, the user may narrate an instruction orally, and the mobile terminal may recognize that the orally narrated instruction is the corresponding first instruction information and/or second instruction information, and the orally narrated instruction is added into the first differential signal and transmitted to the sending device (or signal transmitter). Specifically, in some embodiments of this application, for voice information that serves as the first instruction information, the operation indicated by the voice information may also be to recover the voice information itself by the receiving device (or signal receiver), thereby forming a mechanism of transmitting voice information. For example, in an embodiment, the sending device (or signal transmitter) may also send the instruction orally narrated by the user on the mobile terminal, or the orally narrated instruction together with the authentication information and the parameter information to the receiving device (or signal receiver) by using the first transmission signal, and the receiving device (or signal receiver) may recover the orally narrated instruction and send it to a person at the end of the receiving device (or signal receiver). In addition, in other embodiments, the mechanism of transmitting voice information may also be applied to a voice session that uses the light communication or sound wave communication mode, and the like, which is not limited in this application.

From the foregoing description, it can be seen that in the embodiment of this application, the operation corresponding to the first instruction information, which is mentioned above in the sending device (or signal transmitter) of instruction information, may include at least one of the following: 1) an operation of outputting an unlock signal to an unlock device; 2) an operation of sending a payment request to a payment service platform; and 3) an operation of outputting the voice information to a second user, where the voice information is recovered from the first transmission signal, and the first instruction information and/or the second instruction information includes the voice information input by the first user into the mobile terminal. However, it should be understood that any variation of the technical solution of this application and equivalent implementation manners thereof shall also fall within the protection scope of this application.

It should be noted that in the embodiment of this application, the receiving device (or signal receiver) may also be formed by another mobile terminal, and therefore, the communications mode may also be performed between two mobile terminals, in which one mobile terminal may be connected to the sending device (or signal transmitter) of instruction information, and the other mobile terminal may serve as a receiving device (or signal receiver) to respond to the former. Still further, a sending function and a receiving function may be set on the two separately, and communications between the two may be not limited to unidirectional sending or receiving, but they serve as two symmetric communication terminals, and a role of either of them may be set and adjusted by setting the communication mode.

It should be noted that the technical solution of this application may be used together with other existing or future technical solutions that are practicable. For example, in the embodiment of this application, data transmission between the sending device (or signal transmitter) and the mobile terminal may also be performed with reference to other processing logics loaded on the mobile terminal, and other functions such as a user recognition mechanism and a conversation mechanism may be built-in or installed on the mobile terminal. In this way, involved processes can be implemented by inserting such functions between any steps in the communication mode according to design requirements. For example, in an embodiment, the mobile terminal may first require the user to provide identity recognition information such as a verification code, a voice password, a fingerprint, an inter-pupil distance, a facial image. The mobile terminal opens the data transmission interface or starts the push of the differential signal to the data transmission interface only after the mobile terminal verifies the identity recognition information successfully and recognizes that the user is a valid user. That is, in the embodiment of this application, the sending device (or signal transmitter) may combine with the mobile terminal to implement other functions or fulfill design requirements of higher security levels.

In summary, according to the device provided in the embodiment of this application, for an implementation environment formed by different types of mobile terminals and their receiving devices (or signal receivers), at least the following effects can be accomplished:

1) This application is widely applicable to intelligent terminals with a data transmission interface, such as tablet computers, notebook computers, and personal computers;

2) By means of the adaptation terminal, bidirectional communications can be implemented between a mobile terminal and an intelligent terminal such as a tablet computer, a notebook computer, and a personal computer to implement information transmission;

3) By access of a light adaptation terminal with a data transmission interface, authentication functions such as real-name authentication and mobile money can be implemented on a mobile phone, a tablet computer, a notebook computer, and a personal computer;

4) A light adaptation terminal with a data transmission interface may serve as a startup authentication tool of a computer terminal, thereby avoiding traditional manual input of a password and providing higher confidentiality and security than a traditional manner; and 5) A light adaptation terminal with a data transmission interface may be used to establish a communications medium between intelligent terminals such as a mobile phone, a tablet computer, a notebook computer, and a personal computer, and implement transmission of information such as files.

Embodiment 4

Figure 4:
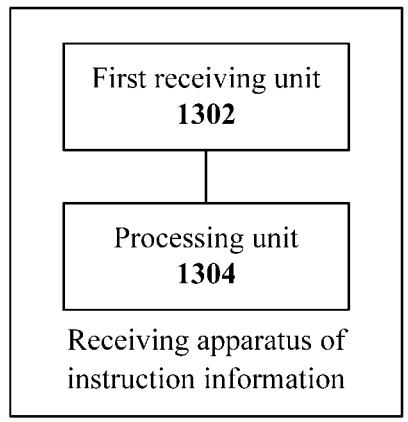
FIG. 4 is a schematic diagram of an optional device for receiving instruction information according to an embodiment of this application.

According to the embodiment of this application, a receiving device of instruction information, which is used to implement the receiving method described in Embodiment 2, is provided. As shown in FIG. 4, the receiving device includes:

1) a first receiving unit 1302, configured to receive a first transmission signal that is sent by the sending device and carries the first instruction information, where the sending device is connected to a data transmission interface of the mobile terminal, so that the sending device acquires a first differential signal that is output by the mobile terminal from the data transmission interface and carries the first instruction information and/or the second instruction information. The second instruction information is used to instruct the sending device to send the first transmission signal, and the first transmission signal is a light signal or a sound wave signal; and 2) a processing unit 1304, configured to perform an operation corresponding to the first instruction information according to the received first transmission signal.

Optionally, in the embodiment of this application, the receiving device may further include:

1) a second receiving unit, configured to receive a second transmission signal that is sent by the sending device and carries authentication information, where the second transmission signal is a light signal or a sound wave signal; and 2) a first transmitting unit, configured to return third instruction information to the sending device according to the received second transmission signal, so that the sending device acquires the first differential signal after receiving the returned third instruction information, or so that the sending device receives and verifies the returned third instruction information and acquires the first differential signal after the verification succeeds.

Further, in the embodiment of this application, the first transmitting unit may include:

1) a transmitting module, configured to generate the third instruction information according to a preset rule and according to the authentication information acquired from the second transmission signal, where the third instruction information matches the authentication information, and return the generated third instruction information to the sending device.

Optionally, in the embodiment of this application, the receiving device may further include:

1) a second transmitting unit, configured to send operation description information of an operation corresponding to the first instruction information to the sending device or the mobile terminal, so that the mobile terminal indicates the operation description information to a user, and so that the mobile terminal generates the first instruction information and/or second instruction information according to input information of the user and/or the operation description information.

Specifically, the operation description information may include at least one of the following: code information, time information, address information, user information, account information, commodity information, and payment information. The payment information may include at least one of the following: an operation of sending a payment request to a payment service platform; and the operation description information may include at least one of the following: a serial number of the payment request, time information of the payment request, site information corresponding to the payment request, a payment sum corresponding to the payment request, an account ID corresponding to the payment request, account balance information corresponding to the payment request, a payer name corresponding to the payment request, and goods information, magnetic track information, and card number information corresponding to the payment request. Further, in the foregoing scenario, the operation corresponding to the first instruction information may include: sending an operation instruction corresponding to the operation description information to a local or third-party platform, where the third-party platform includes at least one of the following: a payment management platform, a bonus points management platform, and a logistics management platform.

In addition, in an embodiment of this application, the first instruction information and/or the second instruction information may also include voice information input by a first user into the mobile terminal. For example, the user may narrate an instruction orally, and the mobile terminal may recognize that the orally narrated instruction is the corresponding first instruction information and/or second instruction information, and the orally narrated instruction is added into the first differential signal and transmitted to the sending device. Specifically, in some embodiments of this application, for voice information that serves as the first instruction information, the operation indicated by the voice information may also be to recover the voice information itself by the receiving device, thereby forming a mechanism of transmitting voice information. For example, in an embodiment, the sending device may also send the instruction orally narrated by the user on the mobile terminal, or the orally narrated instruction together with the authentication information and the parameter information to the receiving device by using the first transmission signal, and the receiving device may recover the orally narrated instruction and send it to a person at the end of the receiving device. In addition, in other embodiments, the mechanism of transmitting voice information may also be applied to a voice session that uses the light communication or sound wave communication mode, and the like, which is not limited in this application.

From the foregoing description, it can be seen that in the embodiment of this application, the operation corresponding to the first instruction information, which is mentioned above in the sending device of instruction information, may include at least one of the following: 1) an operation of outputting an unlock signal to an unlock device; 2) an operation of sending a payment request to a payment service platform; and 3) an operation of outputting the voice information to a second user, where the voice information is recovered from the first transmission signal The first instruction information and/or the second instruction information includes the voice information input by the first user into the mobile terminal. However, it should be understood that any variation of the technical solution of this application and equivalent implementation manners thereof shall also fall within the protection scope of this application.

It should be noted that in the embodiment of this application, the receiving device may also be another mobile terminal, and therefore, the communication mode may also be performed between two mobile terminals, in which one mobile terminal may be connected to the sending device of instruction information, and the other mobile terminal may serve as a receiving device to respond to the former. Still further, a sending function and a receiving function may be set on the two separately, and communications between the two may be not limited to unidirectional sending or receiving, but they serve as two symmetric communication terminals, and a role of either of them may be set and adjusted by setting the communication mode.

In summary, according to the device provided in the embodiment of this application, for an implementation environment formed by different types of mobile terminals and their receiving devices, at least the following effects can be accomplished:

1) This application is widely applicable to intelligent terminals with a data transmission interface, such as tablet computers, notebook computers, and personal computers;

2) By means of the adaptation terminal, bidirectional communications can be implemented between a mobile terminal and an intelligent terminal such as a tablet computer, a notebook computer, and a personal computer to implement information transmission;

3) By access of a light adaptation terminal with a data transmission interface, authentication functions such as real-name authentication and mobile payment can be implemented on a mobile phone, a tablet computer, a notebook computer, and a personal computer;

4) A light adaptation terminal with a data transmission interface may serve as a startup authentication tool of a computer terminal, thereby avoiding traditional manual input of a password and providing higher confidentiality and security than a traditional manner; and 5) A light adaptation terminal with a data transmission interface may be used to establish a communications medium between intelligent terminals such as a mobile phone, a tablet computer, a notebook computer, and a personal computer, and implement transmission of information such as files.

It should be noted that in the embodiment of this application, the optical signal may include at least one of the following: a visible light signal, an infrared light signal, and an ultraviolet light signal; and the sound wave signal includes at least one of the following: an infrasonic wave, an audible sound wave, and an ultrasonic wave.

This application provides some preferred embodiments to further interpret this application. However, it should be noted that the preferred embodiments are intended only to better describe this application but do not constitute any improper limitation on this application.

Embodiment 5

Figure 5:
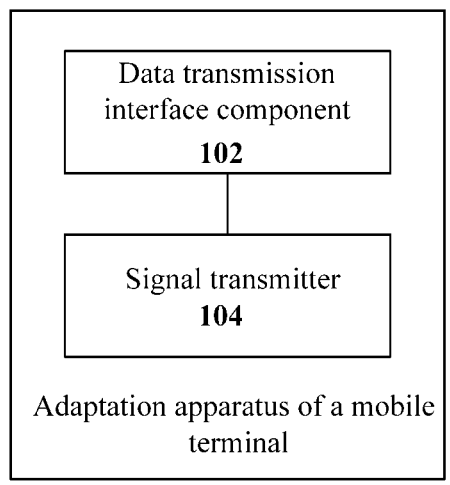
FIG. 5 is a schematic diagram of an optional adaptation device of a mobile terminal according to an embodiment of this application.

Embodiment 5 of this application may provide a connection adaptation device of a data transmission interface of a mobile terminal in a process of implementing the method for sending instruction information that Embodiment 1 intends to protect, where the connection adaptation device is mentioned in the technical solution in the method embodiment 1. As shown in FIG. 5, the adaptation device may include a data transmission interface component 102 and a signal transmitter 104.

1) a data transmission interface component 102, configured to connect a data transmission interface of the mobile terminal, and acquire and output a differential signal that is output from the data transmission interface; and 2) a signal transmitter 104, connected to the data transmission interface component, and configured to transmit a light signal or a sound wave signal.

Here it should be noted that the purpose of the signal transmitter is the same as or corresponds to the functions of the sending device in Embodiment 1, but is not limited to content disclosed in Embodiment 1.

It should be understood that one of problem that the technical solution of this application intends to solve is to provide an adaptation device to implement transmission of information from a mobile terminal to a receiving device (or signal receiver), where the transmitted information may be carried in a light signal or a sound wave signal. Specifically, the information may be instruction information that is used to instruct the receiving device (or signal receiver) to perform a corresponding operation, or other types of information, such as broadcast information and authentication information, where the information content may be diversified, such as digital information, text information, voice information and graphic information, and the operation corresponding to the instruction information may also be diversified, which are not limited in this application.

A plurality of solutions to this problem are available in the prior art. For example, in a traditional mobile terminal application, the solution may be implemented in the following manner: A built-in radio transmitting module and an electromagnetic wave may be used to carry and send information. Alternatively, for a mobile terminal that uses a light communications mode, in order to overcome the problem brought by the preceding manner, the following manner may be applied: The mobile terminal may use a camera flash or the like and use visible light to carry and send the first instruction information to the receiving device (or signal receiver). However, for the latter manner, because light transmitting modules such as camera flashes that are built in the mobile terminals produced by different vendors have different specifications, different light communications solutions need to be designed to match the mobile terminals of different specifications. In other words, the following defect is caused: One method for sending instruction information is hardly compatible with a mobile terminal of a different model.

To overcome the defect, the adaptation device provided in the embodiment of this application may use a data transmission interface component 102 to acquire a differential signal that is output from a data transmission interface of the mobile terminal and carries the information. For example, in some embodiments of this application, the mobile terminal may use its USB interface to transmit a differential signal to an adaptation device connected to the USB interface, so that the adaptation device may acquire the differential signal by using the USB interface component that serves as a data transmission interface component 102, and transmit the differential signal to the signal transmitter 104, and therefore, a light emitting component or a sound emitting component in the signal transmitter 104 is driven to send a light signal or a sound wave signal that carries the information to the outside, so as to fulfill the purpose of transmitting the information.

Specifically, in an implementation manner in which the USB interface of the mobile terminal is used to transmit information to the adaptation device, a differential analog signal output between a positive wiring terminal and a negative wiring terminal of the USB interface may be used to transmit the information to the adaptation device connected to the USB interface, and then the adaptation device uses a light communications or sound communications mode to send the information to the receiving device (or signal receiver). In this process, because the mobile terminals produced by all vendors have relatively consistent designs on the USB interface and the manner of outputting the differential signal through the USB interface, for the adaptation device, the same or similar solutions may be applied to both the design on a physical connection to the USB interface and the design on acquisition and recognition of the differential signal output through the USB interface. In this way, the problem that the existing light communications mode is hardly compatible with a mobile terminal of a different model is overcome at the end of coupling with the mobile terminal.

For the foregoing scenario, it should be noted that although the adaptation device is an external module for the existing mobile terminal and is not a conventional design of the existing mobile terminal, it does not prevented that a designer implants the adaptation device into the mobile terminal in a future design solution of the mobile terminal. From this perspective, the data transmission of the mobile terminal is not necessarily a well-known USB interface exposed outside the mobile terminal, such as a USB interface on a housing of a mobile phone, but the data transmission interface may also be an interface that is disposed inside the mobile terminal, matches the implanted adaptation device and is configured to output an electric signal. It should be understood that for both the existing USB interface disposed outside the mobile terminal and the USB interface that will possibly come forth in the future and will be disposed inside the mobile terminal, the specific shape and the specific structure of the USB interface are diversified, which does not affect implementation of the technical solution of this application and fulfillment of technical effects of the technical solution, and this application does not limit the shape and the structure in any way.

Specifically, in the embodiment of this application, the data transmission interface component 102 may be a USB, mini USB, micro USB or Dock data connector or the like, and the signal transmitter 104 may be a sound wave transmitter or a light wave transmitter. The sound wave transmitter is configured to transmit at least one of an infrasonic wave, an audible wave, and an ultrasonic wave, and the light wave transmitter is configured to transmit at least one of infrared light, visible light, and ultraviolet light, which is not limited in this application.

Figure 6:
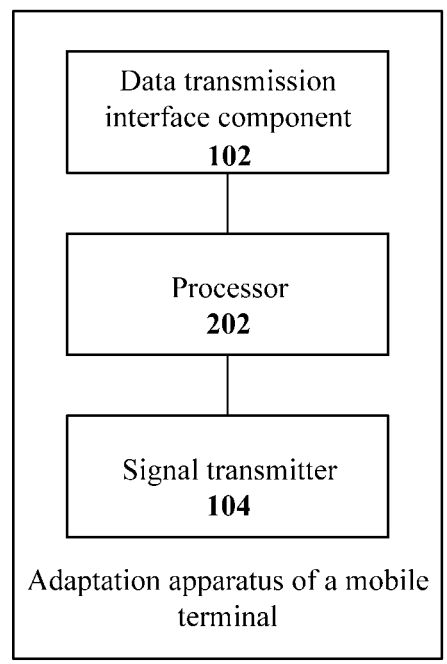
FIG. 6 is a schematic diagram of another optional adaptation device of a mobile terminal according to an embodiment of this application.

Further, as shown in FIG. 6, in the embodiment of this application, the adaptation device may further includes a processor 202 connected between the data transmission interface component and the signal transmitter.

1) The processor 202 is connected between the data transmission component 102 and the signal transmitter 104. The processor 202 is configured to generate and output a digital signal according to the differential signal output by the data transmission interface component 102. The signal transmitter 104 is configured to generate and transmit a light signal or a sound wave signal according to the digital signal output by the processor 202.

In the embodiment of this application, the processor 202 may assist in implementing conversion from the differential signal to the light signal or sound wave signal in the adaptation device, where the conversion may be simple digital-to-analog/analog-to-digital conversion, or may include practicable processing on a digital or analog signal, such as encryption, decryption, encoding, and decoding and other optimization processing, which is not limited in this application.

In this way, in the embodiment of this application, the problem of compatibility of mobile terminals of different models is solved on the side of coupling between the adaptation device and the mobile terminal, and light communications or sound communications are implemented between the adaptation device and the receiving device (or signal receiver), and therefore, advantages of both aspects are exerted. In addition, because a task that needs to be performed by the sending device (or signal transmitter) has simple and intuitional logics, the structure of the sending device may be relatively simple, and manufacturing costs of the sending device are relatively low. Therefore, inconvenience of using the adaptation device is generally avoided for the user.

Figure 7:
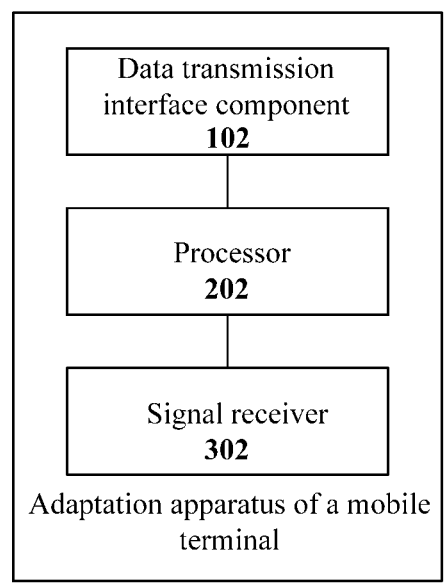
FIG. 7 is a schematic diagram of still another optional adaptation device of a mobile terminal according to an embodiment of this application.

Still further, as shown in FIG. 7, in the embodiment of this application, the adaptation device may further include a signal receiver 302 connected to the processor.

1) The signal receiver 302 is connected to the processor 202. The signal receiver 302 is configured to receive a sound wave signal or a light wave signal, and convert the received sound wave signal or light wave signal into an electrical signal. The processor 202 is further configured to convert the electrical signal into a differential signal, and transmit the differential signal through the data transmission interface 102 to the mobile terminal.

In the embodiment of this application, corresponding to the signal transmitter 104, the adaptation device may further include a signal receiver 302, and therefore, on the basis of communications between the adaptation device and the mobile terminal performed through the data transmission interface component 102, bidirectional communications between the adaptation device and a communication terminal at a peer end are further implemented, where the communication terminal is formed by the receiving device (or signal receiver) and/or the sending device (or signal transmitter). The adaptation device may use the signal receiver 302 to receive a light signal or sound wave signal that comes from the peer end and carries specified information, and generate an electrical signal recognizable by the processor 202. Further, the processor 202 converts the electrical signal into a differential signal and transmits the differential signal to the data transmission interface component 102, so that the information is transmitted to the mobile terminal through the data transmission interface on the mobile terminal by means of the adaptation device, thereby implementing bidirectional communications between the mobile terminal and the peer end. It is easy to understand that in the foregoing scenario, on a precondition that the mobile terminal has the data transmission interface, bidirectional communications are also implemented regardless of the specific product and model of the mobile terminal, thereby fulfilling a technical effect of compatibility with a different type of mobile terminal.

Specifically, the signal receiver 302 may be a sound wave receiver or a light wave receiver. The sound wave receiver may be configured to receive at least one of an infrasonic wave, an audible wave, and an ultrasonic wave, and the light wave receiver may be configured to receive at least one of infrared light, visible light, and ultraviolet light, which is not limited in this application.

It should be noted that in the embodiment of this application, the receiving device (or signal receiver) may also be formed by another mobile terminal, and therefore, the communication mode may also be performed between two mobile terminals, in which one mobile terminal may be connected to the adaptation device of instruction information, and the other mobile terminal may serve as a receiving device (or signal receiver) to respond to the former. Still further, a sending function and a receiving function may be set on the two separately, and communications between the two may be not limited to unidirectional sending or receiving, but they serve as two symmetric communications terminals, and a role of either of them may be set and adjusted by setting the communication mode.

It should be noted that the technical solution of this application may also be combined with other existing technical solutions or practicable technical solutions that will come forth in the future. For example, in the embodiment of this application, more sophisticated interaction logics between the adaptation device and the receiving device (or signal receiver) may be implemented by using the processor 202, which is not limited in this application. In addition, data transmission between the adaptation device and the mobile terminal may also be performed with reference to other processing logics loaded on the mobile terminal, and other functions such as a user recognition mechanism and a conversation mechanism may be built-in or installed on the mobile terminal. In this way, involved processes can be implemented by inserting such functions between any steps in the communication mode according to design requirements. For example, in an embodiment, the mobile terminal may firstly require the user to provide identity recognition information such as a verification code, a voice password, a fingerprint, an inter-pupil distance, a facial image. The mobile terminal opens the data transmission interface or starts the push of the differential signal to the data transmission interface only after the mobile terminal verifies the identity recognition information successfully and recognizes that the user is a valid user. That is, in the embodiment of this application, the adaptation device may combine with the mobile terminal to implement other functions or fulfill design requirements of higher security levels.

Embodiment 6

Figure 8:
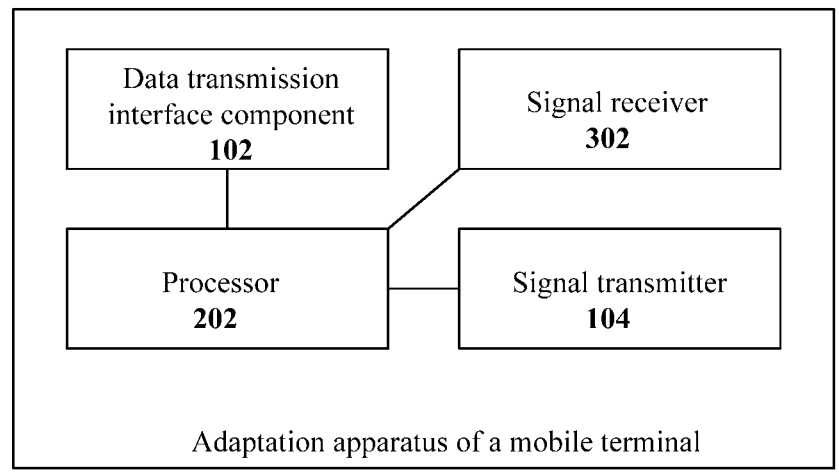
FIG. 8 is a schematic diagram of still another optional adaptation device of a mobile terminal according to an embodiment of this application.

Embodiment 6 of this application may provide a connection adaptation device of a data transmission interface of a mobile terminal in a process of implementing the method for receiving instruction information that Embodiment 2 intends to protect, where the connection adaptation device is mentioned in the technical solution in the method embodiment 2. According to the embodiment of this application, an adaptation device of a mobile terminal, which is connected to a data transmission interface of the mobile terminal, is provided. As shown in FIG. 8, the adaptation device may include a data transmission interface component 102 and a signal receiver 302.

1) a data transmission interface component 102, configured to connect a data transmission interface of the mobile terminal, and acquire and output a first differential signal that is output from the data transmission interface; and 2) a signal receiver 302, connected to the data transmission interface component, and configured to receive a sound wave signal or a light wave signal, and convert the received sound wave signal or light wave signal into an electrical signal.

Here it should be noted that the purpose of the signal receiver is the same as or corresponds to the functions of the receiving device in Embodiment 2, but is not limited to content disclosed in Embodiment 2.

In the embodiment of this application, the adaptation device of the mobile terminal may not necessarily include the signal transmitter 104 in the adaptation device in Embodiment 5, thereby forming an adaptation device that is formed by the data transmitting interface component 102 and the signal receiver 302 and is configured to receive information. The data interface component 102 and the signal receiver 302 may be components that are respectively the same as the data interface component 102 and the signal receiver 302 described in Embodiment 5, which are not described repeatedly herein.

Specifically, the signal receiver 302 may be a sound wave receiver or a light wave receiver. The sound wave receiver may be configured to receive at least one of an infrasonic wave, an audible wave, and an ultrasonic wave, and the light wave receiver may be configured to receive at least one of infrared light, visible light, and ultraviolet light, which is not limited in this application.

Similarly, in the embodiment of this application, a processor 202 may be connected between the data transmission interface component 102 and the signal receiver 302, so as to perform conversion between the differential signal recognizable by the data transmission interface component 102 and the electrical signal output by the signal receiver 302, and process the signals. Specific conversion manners and processing logics may be those described in Embodiment 5, and are not described repeatedly in this application.

In this way, in the embodiment of this application, transmission of information from the outside to the mobile terminal is implemented. In addition, by means of the adaptation device, compatibility with different types of mobile terminal is implemented, and advantages of light communications or light wave communications are exerted, thereby solving the technical problem that the existing light communication mode is hardly compatible with a mobile terminal of a different model.

Embodiment 7

Figure 9:
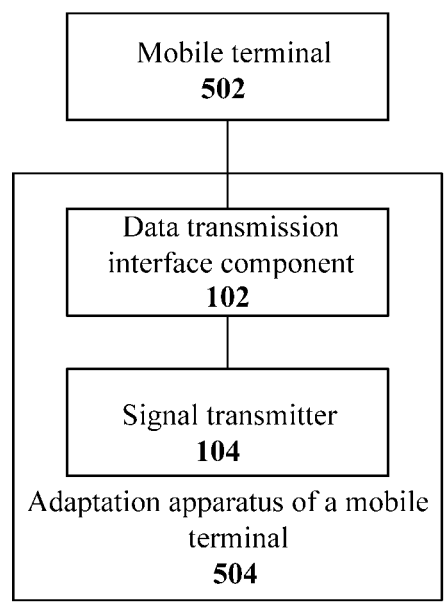
FIG. 9 is a schematic diagram of an optional mobile communication terminal according to an embodiment of this application.

According to the embodiment of this application, a mobile communication terminal is provided. As shown in FIG. 9, the mobile communications terminal includes:

1) a mobile terminal 502 with a data transmission interface provided in one of Embodiment 1 to Embodiment 4; and 2) an adaptation device 504 of a mobile terminal provided in Embodiment 5 or Embodiment 6, which is connected to the data transmission interface.

It is easy to understand that in the embodiment of this application, the mobile terminal 502 and the adaptation device 504 may combine into a complete mobile communication terminal. On the one hand, the adaptation device 504 can implement unidirectional or bidirectional communications with the mobile terminal 502 through the data transmission interface, and on the other hand, can communicate with another communication terminal in a light communication or sound wave communication manner. Therefore, not only the technical problem that the existing light communication mode is hardly compatible with a mobile terminal of a different model is solved, but also advantages of light communications or sound wave communications are exerted.

Embodiment 8

Figure 10:
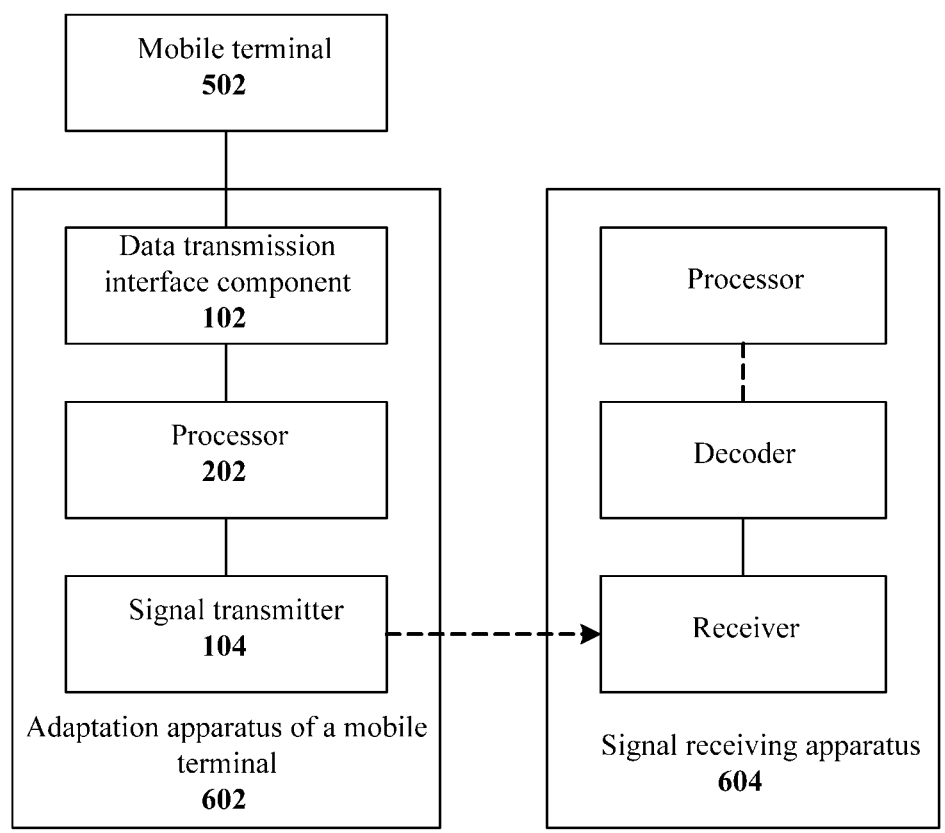
FIG. 10 is a schematic diagram of an optional communication system according to an embodiment of this application.

According to the embodiment of this application, a communication system is provided. As shown in FIG. 10, the communication system includes:

1) a mobile terminal 502 with a data transmission interface provided in one of Embodiment 1 to Embodiment 4;

2) an adaptation device 602 of a mobile terminal, which is provided in Embodiment 5, includes a data transmission interface component 102, a processor 202, and a signal transmitter 104, and is connected to the data transmission interface, where a sound wave or a light wave transmitted by the signal transmitter 104 carries pre-transmitted information; and 3) a signal receiving device (or signal receiver) 604, including a signal receiver and a decoder, where the signal receiver is configured to receive a sound wave or a light wave transmitted by a signal transmitter 104 and convert the sound wave or light wave into an electrical signal, and the decoder is configured to decode the electrical signal to obtain the pre-transmitted information.

It is easy to understand that in the embodiment of this application, the mobile terminal 502, the adaptation device 602, and the signal receiving device (or signal receiver) 604 may combine into a communications system. In the system, the mobile terminal 502 may transmit the pre-transmitted information to the signal receiving device (or signal receiver) 604 by using the adaptation device 602, thereby implementing at least unidirectional communications. In the foregoing scenario, the model of the mobile terminal 502 is not limited either, thereby solving a technical problem that the existing light communication mode is hardly compatible with a mobile terminal of a different model.

Figure 11:
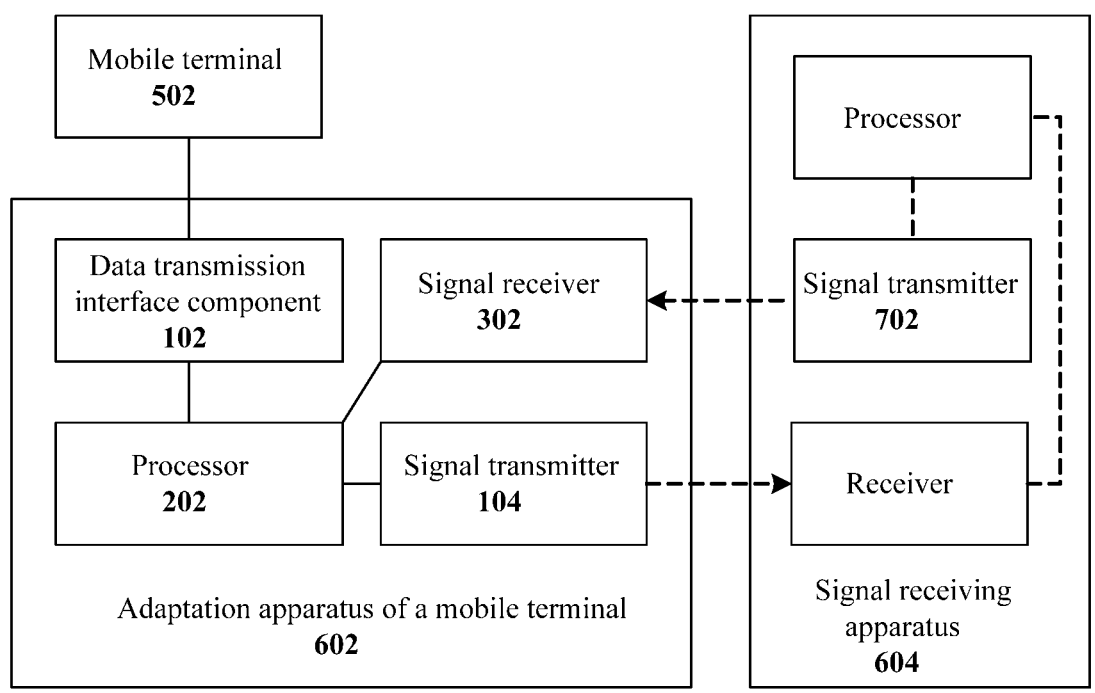
FIG. 11 is a schematic diagram of another optional communication system according to an embodiment of this application.

Further, as shown in FIG. 11, in the embodiment of this application, the signal receiving device (or signal receiver) 604 may include a signal transmitter 702. The signal transmitter 702 may be configured to transmit a sound wave signal or a light wave signal, and further, the adaptation device 602 may include a signal receiver 302, and the signal receiver 302 may be the signal receiver 302 described in Embodiment 5. In the foregoing communications system in the foregoing scenario, communications may be further performed from the signal receiving device (or signal receiver) 604 through the signal transmitter 702 to the adaptation device 602 and the mobile terminal 502 connected to the adaptation device, thereby forming bidirectional communications between the signal receiving device (or signal receiver) 604 and the mobile terminal 502.

It should be noted again that the signal receiving device (or signal receiver) 604 may be the another mobile communication terminal mentioned in Embodiment 6, which is not limited in this application.

Embodiment 9

Figure 12:
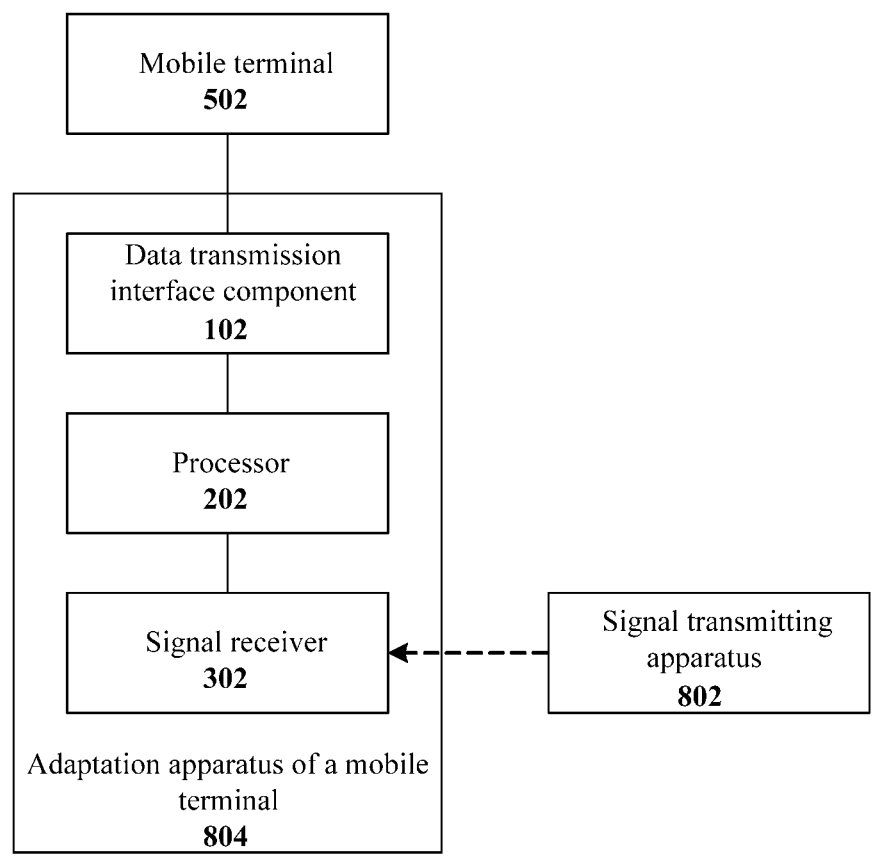
FIG. 12 is a schematic diagram of still another optional communications system according to an embodiment of this application.

According to the embodiment of this application, a communication system is provided. As shown in FIG. 12, the communications system includes:

1) a signal transmitting device 802, including a signal receiver 702 and a decoder and configured to transmit a light signal or a sound wave signal that carries pre-transmitted information;

2) a mobile terminal 502 with a data transmission interface provided in one of Embodiment 1 to Embodiment 4; and 3) an adaptation device 804 of a mobile terminal, which is provided in Embodiment 6, includes a data transmission interface component 102, a processor 202, and a signal receiver 302, and is connected to the data transmission interface, and is configured to receive a light signal or sound wave signal transmitted by the signal transmitting device 802.

It is easy to understand that in the embodiment of this application, the mobile terminal 502, the adaptation device 804, and the signal transmitting device 802 may combine into a communication system. In the system, the mobile terminal 502 may receive pre-transmitted information from the signal transmitter 802 by using the adaptation device 804, thereby implementing at least unidirectional communications. In the foregoing scenario, models of the mobile terminal 502 are not limited either, thereby solving a technical problem that the existing light communication mode is hardly compatible with a mobile terminal of a different model.

This application provides some preferred embodiments to further interpret this application. However, it should be noted that the preferred embodiments are intended only to better describe this application but do not constitute any improper limitation on this application.

The adaptation terminal of a mobile device in this application may be applied for other purposes in addition to data communications, for example, applied to cosmetology when emitting infrared light, applied to money detection when emitting ultraviolet light, applied as a rangefinder or a simplified radar when emitting an ultrasonic wave and receiving an ultrasonic wave simultaneously, and further applicable to fetal monitoring, and applicable to monitoring of natural disasters such as earthquakes and storms when receiving an infrasonic wave. Certainly, to implement the foregoing functions, corresponding applications need to be installed on the mobile device.

The foregoing descriptions are merely exemplary embodiments of this application, but are not intended to limit this application. Persons skilled in the art understand that this application may have various modifications and variations. Any modification, equivalent replacement, and improvement made without departing from the spirit and principle of this application shall fall within the protection scope of this application.

What is claimed is:

1. A method for sending instruction information, comprising:
receiving operation description information of an operation corresponding to first instruction information, wherein the operation description information comprises at least one of the following: code information, time information, address information, user information, account information, commodity information, and payment information;
in a case where the operation description information is received, transmitting the operation description information to a mobile terminal, so that the mobile terminal indicates the operation description information to a user, and so that the mobile terminal generates the first instruction information and second instruction information according to input information of the user and/or the operation description information;
acquiring a first differential signal that is output from a data transmission interface of the mobile terminal and carries the first instruction information and/or the second instruction information, which specifically comprises: acquiring the first differential signal in a case where a recognition signal indicating that a distance between the mobile terminal and a receiving device is smaller than a preset distance threshold is received; and/or
acquiring the first differential signal in a case where a trigger signal sent by the receiving device is received, wherein
in a case where the first instruction information is generated, the first instruction information is used to instruct the receiving device to perform an operation corresponding to the first instruction information, and in a case where the second instruction information is generated, the second instruction information is used to instruct to send the first instruction information to the receiving device; and
generating, according to the acquired first differential signal, a first transmission signal that carries the first instruction information, and sending the first transmission signal to the receiving device, wherein the first transmission signal is a light signal or a sound wave signal;
wherein before the acquiring a first differential signal that is output from a data transmission interface of the mobile terminal and carries the first instruction information and/or the second instruction information, the method further comprises: acquiring a second differential signal that is output from the data cosmetology interface and carries authentication information, wherein the authentication information is used to authenticate the mobile terminal; and generating, according to the acquired second differential signal, a second transmission signal that carries the authentication information, and sending the second transmission signal to the receiving device, wherein the receiving device returns third instruction information according to the authentication information, and the second transmission signal is a light signal or a sound wave signal, wherein the acquiring a first differential signal that is output from a data transmission interface of the mobile terminal and carries the first instruction information and/or the second instruction information comprises: acquiring the first differential signal in a case where the third instruction information is received; or before the acquiring a first differential signal that is output from a data transmission interface of the mobile terminal and carries the first instruction information, the method further comprises: acquiring a second differential signal that is output from the data transmission interface and carries authentication information, wherein the authentication information is used to authenticate the mobile terminal, so that the receiving device returns third instruction information according to the authentication information; and generating, according to the acquired second differential signal, a second transmission signal that carries the authentication information, and sending the second transmission signal to the receiving device, wherein the receiving device returns third instruction information according to the authentication information, and the second transmission signal is a light signal or a sound wave signal, wherein the acquiring a first differential signal that is output from a data transmission interface of the mobile terminal and carries the first instruction information and/or the second instruction information comprises: receiving and verifying the third instruction information, and acquiring the first differential signal in a case where the verification succeeds.

2. The method according to claim 1, wherein the light signal comprises at least one of the following: a visible light signal, an infrared light signal, and an ultraviolet light signal; and/or the data transmission interface comprises at least one of the following: a USB interface, a mini USB interface, a micro USB interface, and a Dock interface; and/or the sound wave signal comprises at least one of the following: an infrasonic wave, an audible sound wave, and an ultrasonic wave.

3. The method according to claim 1, wherein the first instruction information and/or the second instruction information comprises voice information input by a first user into the mobile terminal; and the first instruction information is the voice information, and the operation corresponding to the first instruction information comprises: an operation of outputting the voice information to a second user, wherein the voice information is recovered from the first transmission signal.

4. The method according to claim 1, wherein the method further comprises:
sending, by the receiving device, the operation description information of the operation corresponding to the first instruction information to a sending device or the mobile terminal;
receiving, by the receiving device, the first transmission signal that is sent by the sending device and carries the first instruction information, wherein the sending device is connected to a data transmission interface of the mobile terminal, so that the sending device acquires a first differential signal that is output by the mobile terminal from the data transmission interface and carries the first instruction information and/or the second instruction information; and
performing, by the receiving device, an operation corresponding to the first instruction information according to the received first transmission signal.

5. The method according to claim 4, wherein before the receiving a first transmission signal that is sent by the sending device and carries the first instruction information, the method further comprises:
receiving, by the receiving device, a second transmission signal that is sent by the sending device and carries authentication information, wherein the second transmission signal is a light signal or a sound wave signal; and
generating, by the receiving device, third instruction information according to a preset rule and according to the authentication information acquired from the second transmission signal, wherein the third instruction information matches the authentication information, and returning the generated third instruction information to the sending device, so that the sending device acquires the first differential signal after receiving the returned third instruction information, or so that the sending device receives and verifies the returned third instruction information and acquires the first differential signal after the verification succeeds.

6. A sending device for sending instruction information, comprising:
at least one processing device in communication with a transmission interface and a receiver, wherein the at least one processing device is configured to:
acquire a first differential signal that is output from a data transmission interface of a mobile terminal and carries first instruction information and/or second instruction information, wherein in a case where the first instruction information is generated, the first instruction information is used to instruct a receiving device to perform an operation corresponding to the first instruction information, and in a case where the second instruction information is generated, the second instruction information is used to instruct to send the first instruction information to the receiving device;
generate, according to the acquired first differential signal, a first transmission signal that carries the first instruction information, and send the first transmission signal to the receiving device, wherein the first transmission signal is a light signal or a sound wave signal;
receive the first instruction information and/or operation description information of the operation corresponding to the first instruction information, wherein the operation description information comprises at least one of the following: code information, time information, address information, user information, account information, commodity information, and payment information;
when the operation description information is received, transmit the operation description information to the mobile terminal, so that the mobile terminal indicates the operation description information to a user, and so that the mobile terminal generates the first instruction information and the second instruction information according to input information of the user and/or the operation description information, acquire the first differential signal when a recognition signal indicating that a distance between the mobile terminal and the receiving device is smaller than a preset distance threshold is received, and/or acquire the first differential signal when a trigger signal sent by the receiving device is received;

acquire a second differential signal that is output from the data transmission interface and carries authentication information, wherein the authentication information is used to authenticate the mobile terminal;

generate, according to the acquired second differential signal, a second transmission signal that carries the authentication information, and send the second transmission signal to the receiving device, wherein the receiving device returns third instruction information according to the authentication information, and the second transmission signal is a light signal or a sound wave signal;

acquire the first differential signal when the third instruction information is received; or acquire a second differential signal that is output from the data transmission interface and carries authentication information, wherein the authentication information is used to authenticate the mobile terminal, so that the receiving device returns third instruction information according to the authentication information;

generate, according to the acquired second differential signal, a second transmission signal that carries the authentication information, and send the second transmission signal to the receiving device, wherein the receiving device returns the third instruction information according to the authentication information, and the second transmission signal is a light signal or a sound wave signal, receive and verify the third instruction information; and acquire the first differential signal after the verification succeeds.

7. The sending device according to claim 6, wherein the light signal comprises at least one of the following: a visible light signal, an infrared light signal, and an ultraviolet light signal; and/or the data transmission interface comprises at least one of the following: a USB interface, a mini USB interface, a micro USB interface, and a Dock interface; and/or the sound wave signal comprises at least one of the following: an infrasonic wave, an audible sound wave, and an ultrasonic wave.

8. The sending device according to claim 6, wherein the first differential signal further carries authentication information and/or parameter information, wherein the authentication information is used by the receiving device to authenticate the mobile terminal, and is used by the receiving device to perform, after the authentication succeeds, the operation corresponding to the first instruction information, wherein the parameter information comprises one or more operation parameters that need to be acquired by the receiving device and correspond to the operation, and wherein the at least one processing device is further configured to:

generate, according to the first differential signal, the first transmission signal that carries the first instruction information and the authentication information; or generate, according to the first differential signal, the first transmission signal that carries the first instruction information and the parameter information; or generate, according to the first differential signal, the first transmission signal that carries the first instruction information, the authentication information, and the parameter information.

9. The sending device according to claim 6, wherein the at least one processing device is further configured to:

acquire the first differential signal when a recognition signal indicating that a distance between the mobile terminal and the receiving device is smaller than a preset distance threshold is received, and/or acquire the first differential signal when a trigger signal sent by the receiving device is received.

10. The sending device according to claim 6, wherein the first instruction information and/or the second instruction information comprises voice information input by a first user into the mobile terminal; and the first instruction information is the voice information, and the operation corresponding to the first instruction information comprises: an operation of outputting the voice information to a second user, wherein the voice information is recovered from the first transmission signal.

11. The method according to claim 1, wherein the method further comprises:

receiving first instruction information;

in a case where the first instruction information is received, temporarily storing the received first instruction information locally.

12. The sending device according to claim 6, wherein the at least one processing device is further configured to:

when the first instruction information is received, temporarily store the received first instruction information locally.

* * * * *